United States Patent
Benson et al.

(10) Patent No.: US 9,731,638 B2
(45) Date of Patent: Aug. 15, 2017

(54) SEAT CUSHION FOR A VEHICLE SEAT

(71) Applicant: FAURECIA AUTOMOTIVE SEATING LLC, Troy, MI (US)

(72) Inventors: Matthew K. Benson, Holland, MI (US); Brian R. Dexter, Grand Haven, MI (US); Christopher L. Hogg, Holland, MI (US); Gregory Brncick, Holland, MI (US); Adam Deck, Holland, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 160 days.

(21) Appl. No.: 14/426,467

(22) PCT Filed: Sep. 20, 2013

(86) PCT No.: PCT/US2013/060864
§ 371 (c)(1),
(2) Date: Mar. 6, 2015

(87) PCT Pub. No.: WO2014/047417
PCT Pub. Date: Mar. 27, 2014

(65) Prior Publication Data
US 2015/0210192 A1 Jul. 30, 2015

Related U.S. Application Data

(60) Provisional application No. 61/703,641, filed on Sep. 20, 2012.

(51) Int. Cl.
*B60N 2/52* (2006.01)
*B60N 2/50* (2006.01)
*B60N 2/44* (2006.01)
*B60N 2/00* (2006.01)
*B60N 2/02* (2006.01)

(52) U.S. Cl.
CPC ............ *B60N 2/525* (2013.01); *B60N 2/002* (2013.01); *B60N 2/4415* (2013.01); *B60N 2/505* (2013.01); *B60N 2002/026* (2013.01); *B60N 2002/0268* (2013.01)

(58) Field of Classification Search
CPC ...... B60N 2/525; B60N 2/002; B60N 2/4415; B60N 2/505; B60N 2/026; B60N 2/0268
See application file for complete search history.

(56) References Cited

U.S. PATENT DOCUMENTS

| | | | |
|---|---|---|---|
| 2,938,570 A | 5/1960 | Flajole | |
| 3,330,598 A | 7/1967 | Whiteside | |
| 4,655,505 A * | 4/1987 | Kashiwamura | A47C 7/467 297/284.6 |

(Continued)

FOREIGN PATENT DOCUMENTS

EP 0345806 A2 12/1989

OTHER PUBLICATIONS

PCT Search Report and Written Opinion completed on Feb. 10, 2014 and issued in connection with PCT/US2013/060864.

*Primary Examiner* — Timothy J Brindley
(74) *Attorney, Agent, or Firm* — Barnes & Thornburg LLP

(57) ABSTRACT

A vehicle seat includes a seat bottom and a seat back coupled to the seat bottom to move relative to the seat bottom. The seat bottom includes a cushion configured to have a variable shape.

22 Claims, 22 Drawing Sheets

(56) References Cited

U.S. PATENT DOCUMENTS

| | | | | |
|---|---|---|---|---|
| 4,885,827 A * | 12/1989 | Williams | B60N 2/4415 | 29/91.1 |
| 5,082,326 A * | 1/1992 | Sekido | B60N 2/4415 | 297/284.6 |
| 5,346,170 A * | 9/1994 | Schmidt | B60N 2/501 | 248/421 |
| 5,529,377 A * | 6/1996 | Miller | A47C 4/54 | 297/284.6 |
| 5,711,575 A * | 1/1998 | Hand | A47C 7/425 | 297/284.5 |
| 5,765,915 A | 6/1998 | Lee | | |
| 6,129,419 A * | 10/2000 | Neale | B60N 2/4415 | 297/284.4 |
| 6,203,105 B1 * | 3/2001 | Rhodes, Jr. | A47C 4/54 | 297/284.1 |
| 2004/0051357 A1 * | 3/2004 | Houle | B60N 2/525 | 297/284.1 |
| 2004/0222684 A1 | 11/2004 | VanSickle | | |
| 2006/0082210 A1 * | 4/2006 | Fletcher | A47C 7/021 | 297/452.41 |
| 2007/0057551 A1 * | 3/2007 | Lachenmann | B60N 2/4492 | 297/284.9 |
| 2010/0094514 A1 * | 4/2010 | Ueda | B60N 2/002 | 701/49 |
| 2010/0289302 A1 * | 11/2010 | Cheng | B60N 2/002 | 297/180.12 |
| 2012/0086249 A1 * | 4/2012 | Hotary | B60N 2/0228 | 297/284.3 |
| 2012/0248840 A1 * | 10/2012 | Becker | B60N 2/045 | 297/344.1 |
| 2013/0285426 A1 * | 10/2013 | Arant | B60N 2/62 | 297/284.1 |
| 2014/0070593 A1 * | 3/2014 | Hughes | B60N 2/4415 | 297/452.41 |
| 2014/0167465 A1 * | 6/2014 | Sakata | B60N 2/0284 | 297/284.11 |
| 2014/0183918 A1 * | 7/2014 | Kaku | B60N 2/002 | 297/344.15 |
| 2016/0207429 A1 * | 7/2016 | Fitzpatrick | B60N 2/646 | |
| 2016/0236597 A1 * | 8/2016 | Dry | B60N 2/525 | |
| 2016/0288681 A1 * | 10/2016 | Ferretti | B60N 2/72 | |

* cited by examiner

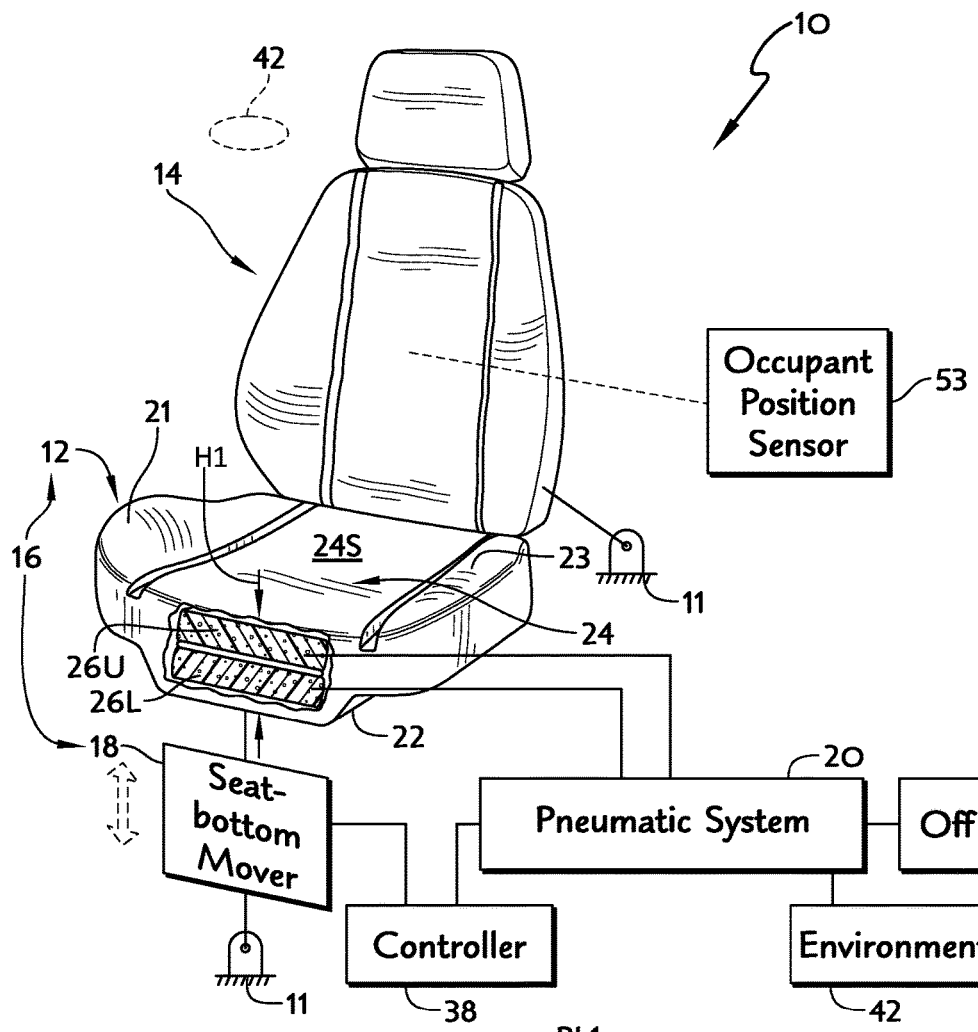
FIG. 1
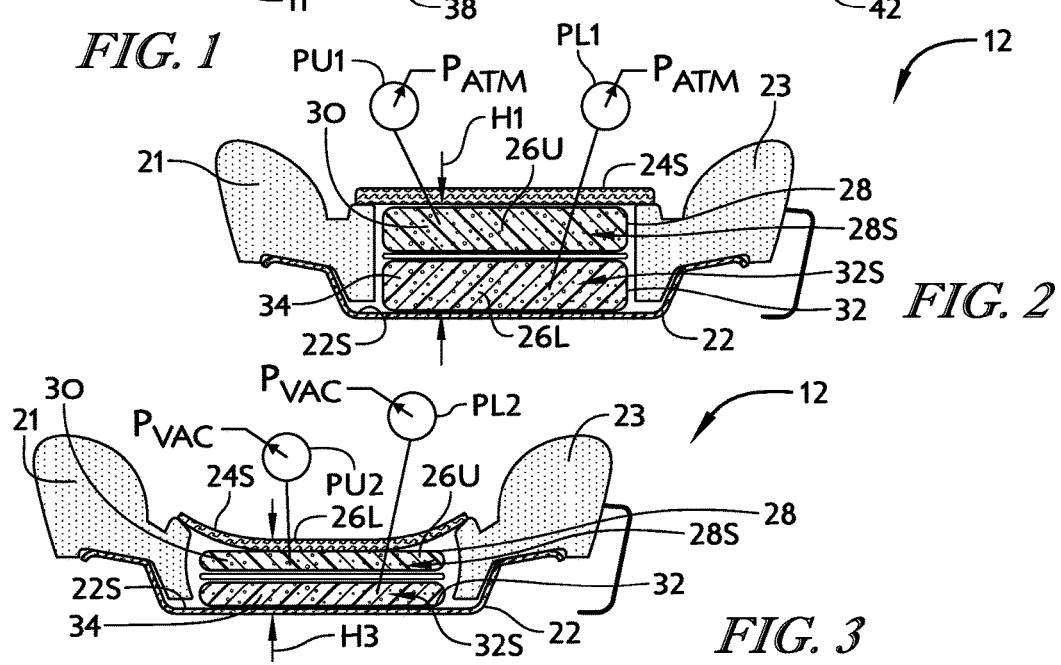
FIG. 2
FIG. 3

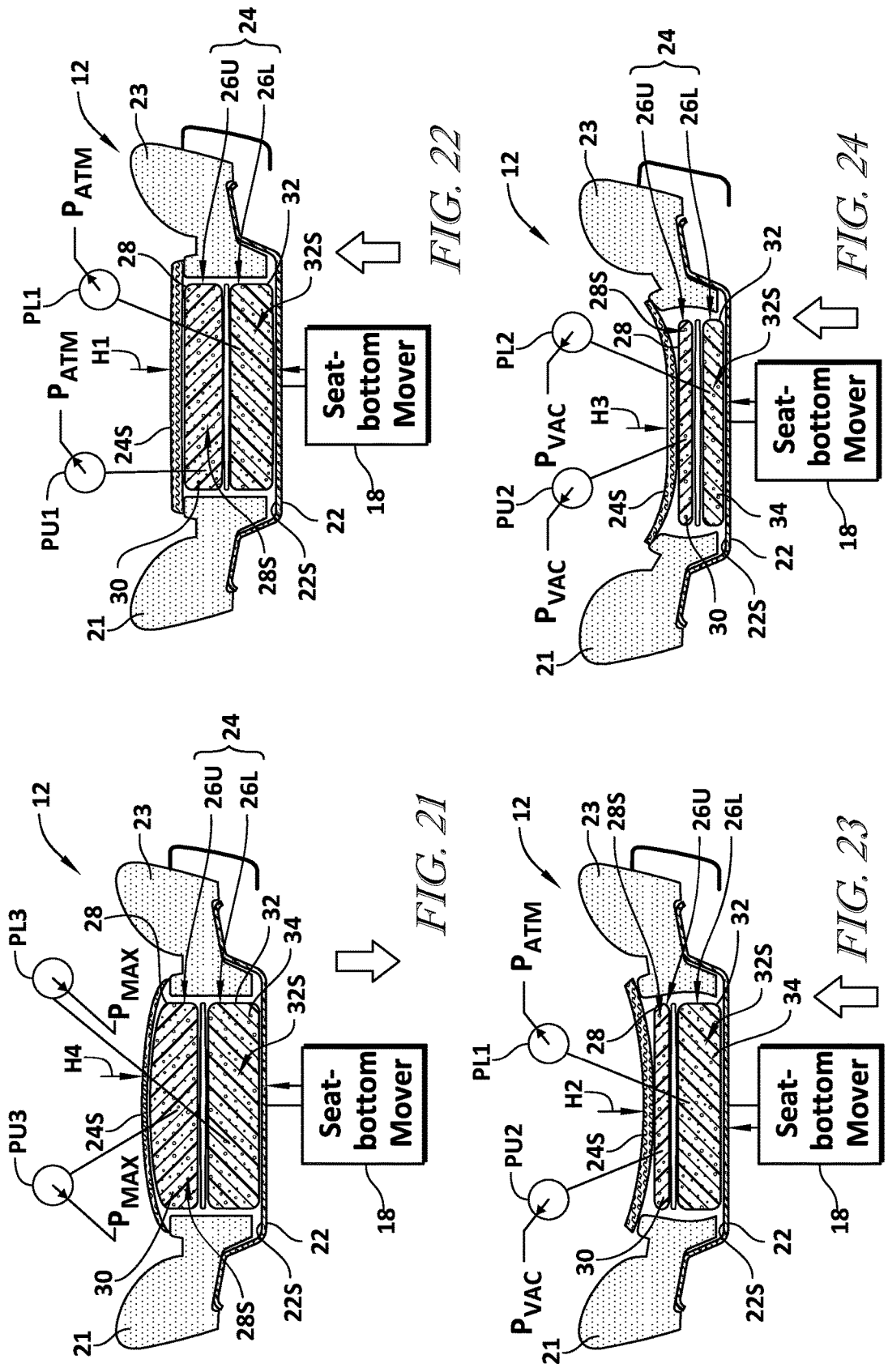

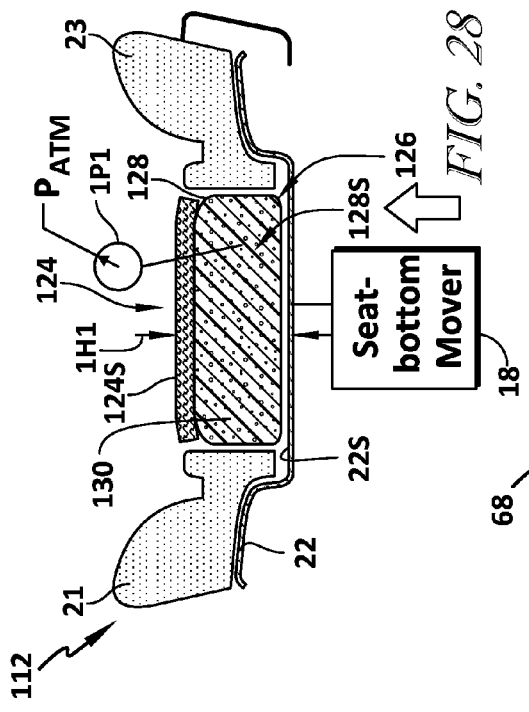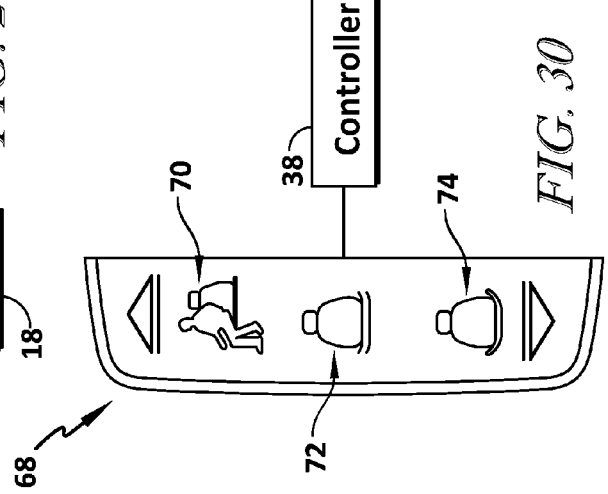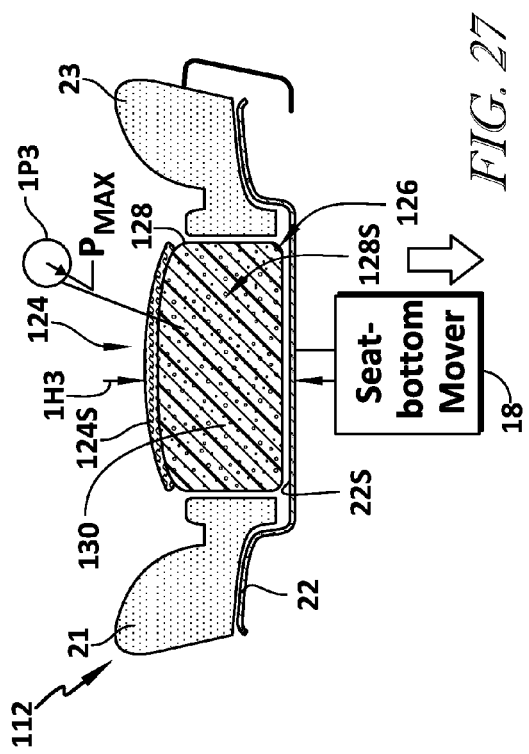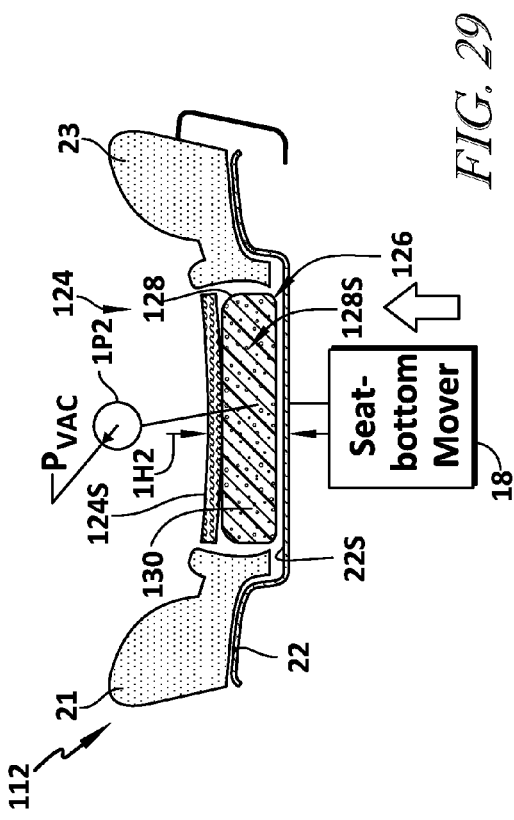

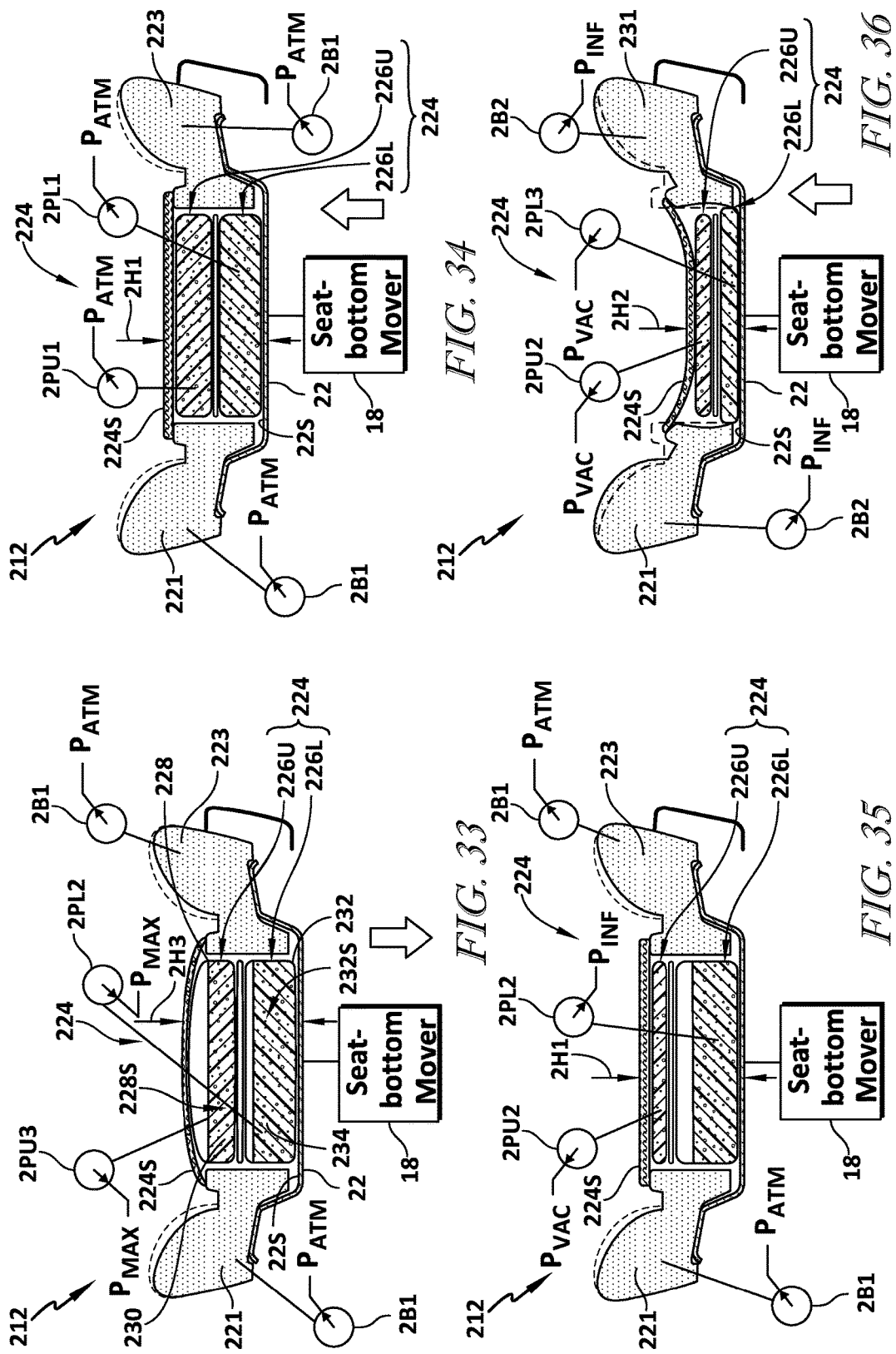

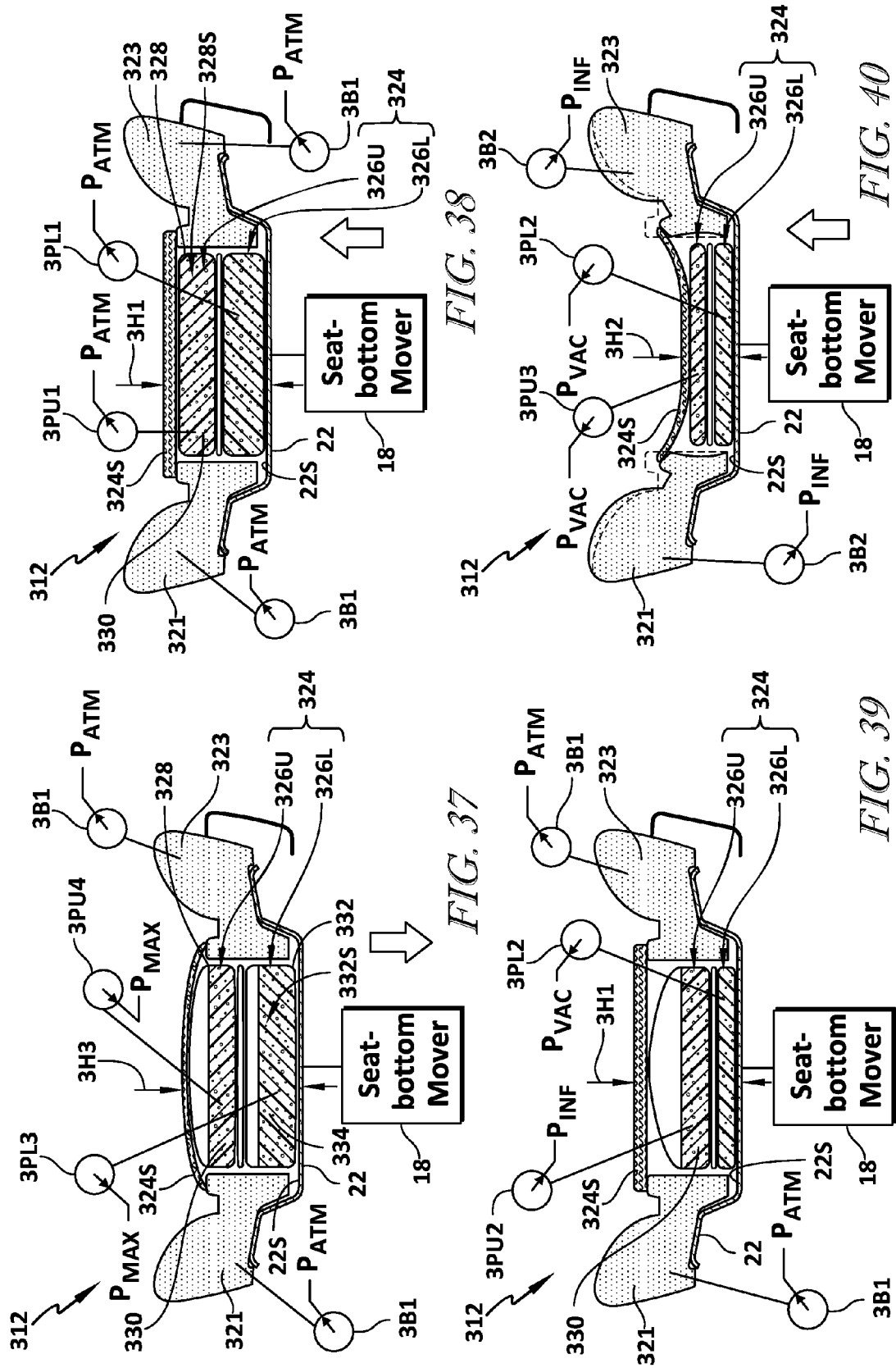

SEAT CUSHION FOR A VEHICLE SEAT

CROSS REFERENCE TO RELATED APPLICATIONS

This application is a U.S. national counterpart application of international application serial No. PCT/US2013/060864 filed Sep. 20, 2013, which claims priority to U.S. Provisional Patent Application No. 61/703,641 filed Sep. 20, 2012. The entire disclosures of PCT/US2013/060864 and U.S. Ser. No. 61/703,641 are hereby incorporated by reference.

BACKGROUND

The present disclosure relates to a vehicle seat, and in particular to a vehicle seat including an expandable and contractable portion. More particularly, the present disclosure relates to a vehicle seat having a variable shape.

SUMMARY

According to the present disclosure, a vehicle seat includes a seat base and a seat back. The seat back is coupled to the seat base to extend upwardly from a rear portion of the seat base. The seat base includes a seat bottom and a seat-bottom mover. The seat-bottom mover is coupled to the seat bottom to vary a height of the seat bottom relative to the seat back.

In illustrative embodiments, the seat bottom includes a first thigh bolster, a second thigh bolster spaced apart from the first thigh bolster, and a seat pad positioned to lie between the first and second thigh bolsters. The seat pad is configured to provide means for varying firmness and thickness of the seat pad to cause at least one of a first, second, third, and fourth arrangement to be established so that comfort and performance of the seat bottom are customized according to occupant preference.

In illustrative embodiments, the seat pad is configured to have a first firmness level and a first thickness that are consistent with normal driving when in the first arrangement. The seat pad is configured to have a relatively greater second firmness level and relatively lesser second thickness that are consistent with a fitted arrangement of the vehicle seat when in the second arrangement. The seat pad is configured to have the relatively greater second firmness level and a relatively lesser third thickness that are consistent with a performance driving when in the third arrangement. The seat pad is configured to have a relatively greatest third firmness level and a relatively greatest fourth thickness that are consistent with ingress and egress from the vehicle when in the fourth arrangement.

In illustrative embodiments, the seat pad includes an upper cushion coupled to a pneumatic system and a lower cushion coupled to the pneumatic system. The upper cushion may be inflated independently of the lower cushion so that one of the first, second, third, and fourth arrangements of the seat bottom may be obtained.

In illustrative embodiments, the upper cushion includes a cushion bladder formed to include a space and a cushion core. The cushion core is positioned to lie in the space of the cushion bladder. When the seat bottom is in the first arrangement, the pneumatic system exposes the cushion core to atmospheric pressure. When the seat bottom is in the second arrangement, the cushion core is exposed to vacuum by the pneumatic system. When the cushion bladder is in the third arrangement, the pneumatic system maintains the vacuum applied to the cushion core. When the seat bottom is in the fourth arrangement, pressurized air is admitted to the upper cushion to inflate the cushion bladder.

In a further embodiment, an occupant-support base for a vehicle seat comprises a seat pan and a seat pad. The seat pad is coupled to the seat pan to move therewith and configured to provide means for varying a firmness level and a thickness of the seat pad to cause at least a first arrangement to be established in which a first firmness level is provided and a first thickness of the seat pad to be defined between an upper seat-pad surface and an upper seat-pan surface of the seat pan and at least a second arrangement of the occupant-support base to be established in which a relatively greater second firmness level is provided and a relatively lesser second thickness is established so that the seat pad is configured as desired by an occupant.

In a further embodiment, the seat pad includes an upper cushion located above the seat pan.

In a further embodiment, the seat pad includes a lower cushion located between the upper cushion and the seat pan.

In a further embodiment, the occupant-support base further comprises a seat-bottom mover coupled to the seat pan to cause a vertical location and orientation of the seat pan to vary.

In a further embodiment, the occupant-support base further comprises a pneumatic system coupled to the upper cushion.

In a further embodiment, the pneumatic system removes gas from the upper cushion to establish a vacuum pressure in the upper cushion to cause the second arrangement to be established.

In a further embodiment, the lower cushion is coupled to the pneumatic system.

In a further embodiment, the pneumatic system removes gas from the lower cushion to establish a vacuum pressure in the lower cushion to cause the second arrangement to be established.

In a further embodiment, the upper cushion includes a cushion bladder formed to include a space therein and a cushion core positioned to lie in the space.

In a further embodiment, the cushion core has a first density when the occupant-support base is in the first arrangement and a relatively higher second density with the occupant-support base is in the second arrangement.

In a further embodiment, the seat-bottom mover is configured to raise the seat pan in response to the occupant-support base going from the first arrangement to the second arrangement to cause an occupant reference point to be maintained relative to the seat-bottom mover.

In a further embodiment, the occupant reference point is an H-point of the occupant.

In a further embodiment, the occupant reference point is an eye level of the occupant.

In a further embodiment, the lower cushion includes a cushion bladder formed to include a space therein and a core positioned to lie in the space and the core has a first density when the occupant-support base is in the first arrangement and the first density when the occupant-support base is in the second arrangement.

In a further embodiment, a third arrangement of the occupant-support base is established in which a relatively greater third firmness level is provided and a relatively lesser third thickness is established, the relatively greater third firmness is firmer than the relatively greater second firmness, and the relatively lesser third thickness is less than the relatively lesser second thickness.

In a further embodiment, a fourth arrangement of the occupant-support base is established in which a relatively greater fourth firmness level is provided and a relatively greater fourth thickness is established, the relatively greater fourth firmness is firmer than the relatively greater third firmness, and the relatively greater fourth thickness is greater than the first thickness.

In a further embodiment, the seat pad includes an upper cushion located in spaced-apart relation above the seat pan and a lower cushion located between the upper cushion and the seat pan and the upper cushion has a first upper density and the lower cushion has a first lower density when the occupant-support base is in the first arrangement.

In a further embodiment, the upper cushion has a relatively greater second upper density and the lower cushion has the first lower density the when the occupant-support base is in the second arrangement.

In a further embodiment, a third arrangement of the occupant-support base is established in which a relatively greater third firmness level is provided and a relatively lesser third thickness is established, the relatively greater third firmness is firmer than the relatively greater second firmness, the relatively lesser third thickness is less than the relatively lesser second thickness, the upper cushion has the relatively greater second upper density, and the lower cushion has a relatively greater second lower density.

In a further embodiment, a fourth arrangement of the occupant-support base is established in which a relatively greater fourth firmness level is provided and a relatively greater fourth thickness is established, the relatively greater fourth firmness is firmer than the relatively greater third firmness, the relatively greater fourth thickness is greater than the first thickness, the upper cushion has the first upper density, and the lower cushion has the first lower density.

In a further embodiment, the seat pad includes an upper cushion located in spaced-apart relation above the seat pan and a lower cushion located between the upper cushion and the seat pan and the upper cushion has a first upper pressure and the lower cushion has a first lower pressure when the occupant-support base is in the first arrangement.

In a further embodiment, the upper cushion has a relatively lesser second upper pressure and the lower cushion has the first lower pressure when the occupant-support base is in the second arrangement.

In a further embodiment, a third arrangement of the occupant-support base is established in which the upper cushion has the relatively lesser second lower pressure therein and the lower cushion has a relatively lesser second lower pressure therein.

In a further embodiment, a fourth arrangement of the occupant-support base is established in which the upper cushion has a relatively greater third upper pressure therein and the lower cushion has a relatively greater third lower pressure therein.

In a further embodiment, the seat pad includes a cushion cover that is formed to include a space therein defined by the cushion cover and the seat pan and a cushion located in the space and arranged to extend between the seat pan and the cushion cover and the cushion has a first density when the occupant-support base is in the first arrangement.

In a further embodiment, the cushion has a relatively greater second density when the occupant-support base is in the second arrangement.

In a further embodiment, a third arrangement of the occupant-support base is established in which a relatively greater third firmness level is provided and a relatively greater third thickness is established, the relatively greater third firmness is firmer than the relatively greater first and second firmnesses, the relatively greater third thickness is greater than the first thickness, and the cushion has the first density.

In a further embodiment, the seat pad includes an upper cushion located in spaced-apart relation above the seat pan and a lower cushion located between the upper cushion and the seat pan and the upper cushion has a first upper density and the lower cushion has a first lower density when the occupant-support base is in the first arrangement and the seat base further includes a first bolster and a second bolter spaced-apart from the first bolster to locate the seat pad therebetween and the first bolster and the second bolster each have a first bolster pressure therein when the occupant-support base is in the first arrangement.

In a further embodiment, the upper cushion has a relatively greater second upper density, the lower cushion has a relatively greater second lower density, and the first and second bolsters have a relatively greater second bolster pressure therein when the occupant-support base is in the second arrangement.

In a further embodiment, a third arrangement of the occupant-support base is established in which a third firmness level is provided and the first thickness is maintained, the third firmness level is less than the relatively greater second firmness level and greater than the first firmness level, and the upper cushion has the relatively greater second upper density, the lower cushion has a relatively lesser third lower density, and the relatively lesser third lower density is less than the first lower density.

In a further embodiment, a third arrangement of the occupant-support base is established in which a the second firmness level is provided and the first thickness is maintained, the third firmness level is less than the relatively greater second firmness level and greater than the first firmness level, and the upper cushion has a relatively lesser third upper density, the lower cushion has the relatively greater second lower density, and the relatively lesser third upper density is less than the first upper density.

In a further embodiment, a control system including an occupant-position sensor is coupled to the seat-bottom and configured to detect a vertical position of an occupant-reference point of an occupant supported by the occupant-support base and a controller coupled to the occupant-position sensor to receive to the vertical position of the occupant-reference point and command a seat-bottom mover to change the vertical location of the seat pan to cause an optimal location of the occupant to be maintained.

In a further embodiment, the occupant reference point is an H-point of the occupant.

In a further embodiment, the occupant reference point is an eye level of the occupant.

In a further embodiment, the seat pad includes an upper cushion including an upper bladder formed to include an upper-bladder space and an upper core located therein and a lower cushion including a lower bladder formed to include a lower-bladder space and a lower core located in the lower-bladder space.

In a further embodiment, the upper core is made of a foam material and the lower core is made from a foam material.

In a further embodiment, the upper core includes a first upper layer and a second upper layer located between the first upper layer and the lower cushion.

In a further embodiment, the first upper layer is made from a first foam material and the second upper layer is made from a second foam material.

In a further embodiment, the first foam material is different than the second foam material.

In a further embodiment, the upper core includes a plurality of foam spheres and the plurality of spheres move relative to one another when the occupant-support base is in the first arrangement.

In a further embodiment, movement between the plurality of foam spheres relative to one another is minimized in response to removing gas from the upper cushion to establish a vacuum pressure therein.

In a further embodiment, the upper core includes a core body formed to include a passageway therein and a pillar located in the passageway of the core body and arranged to extend between and interconnect an upper portion of the upper bladder and a lower portion of the upper bladder to block an upper surface of the seat pad from establishing a convex shape that extends upwardly away from the seat pan when pressurized gas is admitted into the upper bladder to cause the upper bladder to inflate and establish a maximum volume of the upper bladder.

In a further embodiment, the upper core includes a core body formed to include passageways spaced apart from one another and a plurality of pillars, one of the plurality of pillars is located in each passageway, and each pillar is arranged to extend between and interconnect an upper portion of the upper bladder and a lower portion of the upper bladder to cause an upper surface of the seat pad to establish an undulating shape.

In a further embodiment, the occupant-support base further comprises a control system including a first sensor configured to detect a presence of an occupant resting on the occupant-support base and provide a first signal indicative of the presence of the occupant resting on the occupant-support base, a second sensor configured to detect a vertical position of an occupant-reference point of an occupant supported by the occupant-support base and provide a second signal indicative of the vertical position of the occupant-reference point, and a controller coupled to the first and second sensors to receive the first and second signals and command a seat-bottom mover to change the vertical location of the seat pan to cause an optimal location of the occupant to be maintained.

In a further embodiment, the controller, in response to receipt of the first sensor signal indicating an occupant is resting on the occupant-support base determines a minimal amount electrical current required to move the seat-bottom mover and determines a weight of the occupant using the minimal amount of electrical current.

In a further embodiment, the controller uses the weight of the occupant to determine a seat-bottom mover rate and uses the seat-bottom mover rate to cause the optimal location of the occupant to be maintained.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a vehicle seat in accordance with the present disclosure showing that the vehicle seat includes a seat back, a seat bottom movable relative to the seat back, and a seat-bottom mover coupled to the seat bottom to move the seat bottom up and down relative to the seat back to cause a passenger seated on the seat bottom to be maintained at about a constant elevation relative to a vehicle floor and suggesting that a pneumatic system may be used to vary a firmness and thickness of a seat pad included in the seat bottom;

FIG. 2 is a sectional view taken along line 2-2 of FIG. 1 showing that the seat bottom includes, from left to right, a first thigh bolster, the seat pad including an upper variable-firmness cushion and a lower variable-firmness cushion, and a second thigh bolster and showing that the upper and lower variable-firmness cushions are arranged in a normal-driving arrangement in which an upper surface of the seat bottom is relatively flat and the seat pad has relatively low firmness;

FIG. 3 is a view similar to FIG. 2 showing the seat bottom after the pneumatic system has been activated to remove air from the upper and lower variable-firmness cushions to cause a performance-driving arrangement of the seat pad to be established in which the upper surface has curved downwardly and the seat pad has a relatively greater firmness;

FIG. 4 is diagrammatic view of the vehicle seat of FIG. 1 showing that the vehicle seat includes the seat back, a seat base comprising the seat bottom including first and second sensors and upper and lower variable-firmness cushions and the seat-bottom mover including a seat-bottom lifter and a seat-bottom tilter, a pneumatic system including an air pump configured to provide pressurized air or vacuum to a manifold which provides pressurized air or vacuum to the upper and lower variable firmness cushions and allows air to vent to the environment from the upper and lower cushions, and a controller coupled to the seat-bottom mover and to the pneumatic system to vary the air pressure in the upper and lower variable-firmness cushions while coordinating vertical movement of the seat bottom relative to the vehicle floor so that the occupant is maintained at about a constant elevation relative to the vehicle floor;

FIGS. 5-8 are a series of views showing how the seat-bottom mover and the upper and lower variable-firmness cushions cooperate together to provide various arrangements of the seat bottom while maintaining the occupant at about a constant elevation relative to the vehicle frame;

FIG. 5 is a diagrammatic view of a seat base in accordance with the present disclosure showing the seat base in an egress/ingress arrangement in which both the upper and lower variable-firmness cushions have been inflated by the pneumatic system to provide a relatively great firmness while the seat-bottom mover has lowered the seat bottom to aid the occupant during ingress/egress from the vehicle seat;

FIG. 6 is a view similar to FIG. 5 showing the seat base in the normal-driving arrangement in which both the upper and lower variable-firmness cushions have been exposed to atmospheric pressure by the pneumatic system to provide the relatively lesser firmness while the seat-bottom mover has adjusted the seat bottom to cause the occupant to be at an optimal height above the vehicle floor so that enhanced comfort is provided to the occupant during normal driving;

FIG. 7 is a view similar to FIG. 6 showing the seat base in a fitted-driving arrangement in which both the upper and lower variable-firmness cushions have begun to be deflated to provide a relatively greater firmness while the seat-bottom mover has moved the seat bottom upwardly to cause the occupant to remain at the optimal height above the vehicle floor so that comfort and performance of the seat bottom are maximized during advanced driving;

FIG. 8 is a view similar to FIG. 7 showing the seat base in a performance-driving arrangement in which the pneumatic system has applied vacuum to both the upper and lower variable-firmness cushions to provide an even greater firmness while the seat-bottom mover has continued to move the seat bottom upwardly to cause the occupant to remain at the optimal height above the vehicle floor so that performance of the seat bottom is maximized during performance driving;

FIGS. 21-24 are a series of elevation views of the seat base of FIG. 1 showing how the upper and lower variable-firmness cushions may be varied to obtain the ingress/egress arrangement, the normal-driving arrangement, the fitted-driving arrangement, and the performance-driving arrangement;

FIG. 21 is a diagrammatic and elevation view of the seat base of FIG. 1 showing that both the upper and lower variable-firmness cushions have been inflated and the seat-bottom mover has been lowered to establish the ingress/egress arrangement of the seat base;

FIG. 22 is a view similar to FIG. 21 showing that both variable-firmness cushions have been returned to atmospheric pressure and that the seat-bottom mover has been raised to establish the normal-driving arrangement of the seat base;

FIG. 23 is a view similar to FIG. 22 showing that air in the upper variable-firmness cushion has been vacuumed to increase firmness of the seat bottom and lower the upper surface of the seat pad and that seat-bottom mover has been raised further to establish the fitted-driving arrangement of the seat base;

FIG. 24 is a view similar to FIG. 23 showing that air in both the upper and lower variable-firmness cushions has been vacuumed to increase firmness of the seat bottom and further lower the upper surface of the seat pad and that the seat-bottom mover has been raised even further to establish the performance-driving arrangement;

Figure 26A:
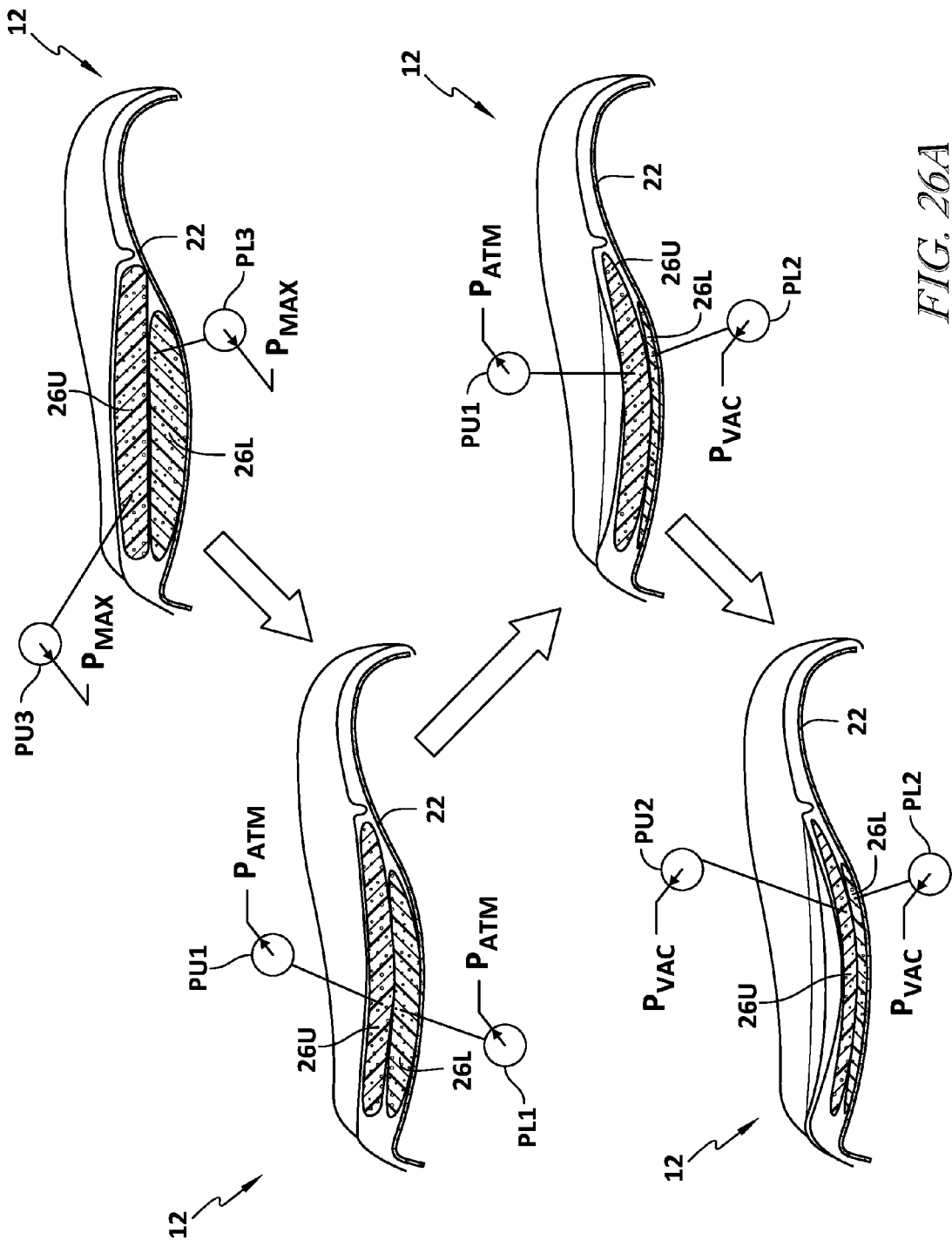
FIGS. 26A and 26B are a series of views showing how the controller commands the pneumatic system to cause the seat base to assume one of the ingress/egress arrangement, the normal-driving arrangement, the fitted-driving arrangement, and the performance-driving arrangement.
Figure 26B:
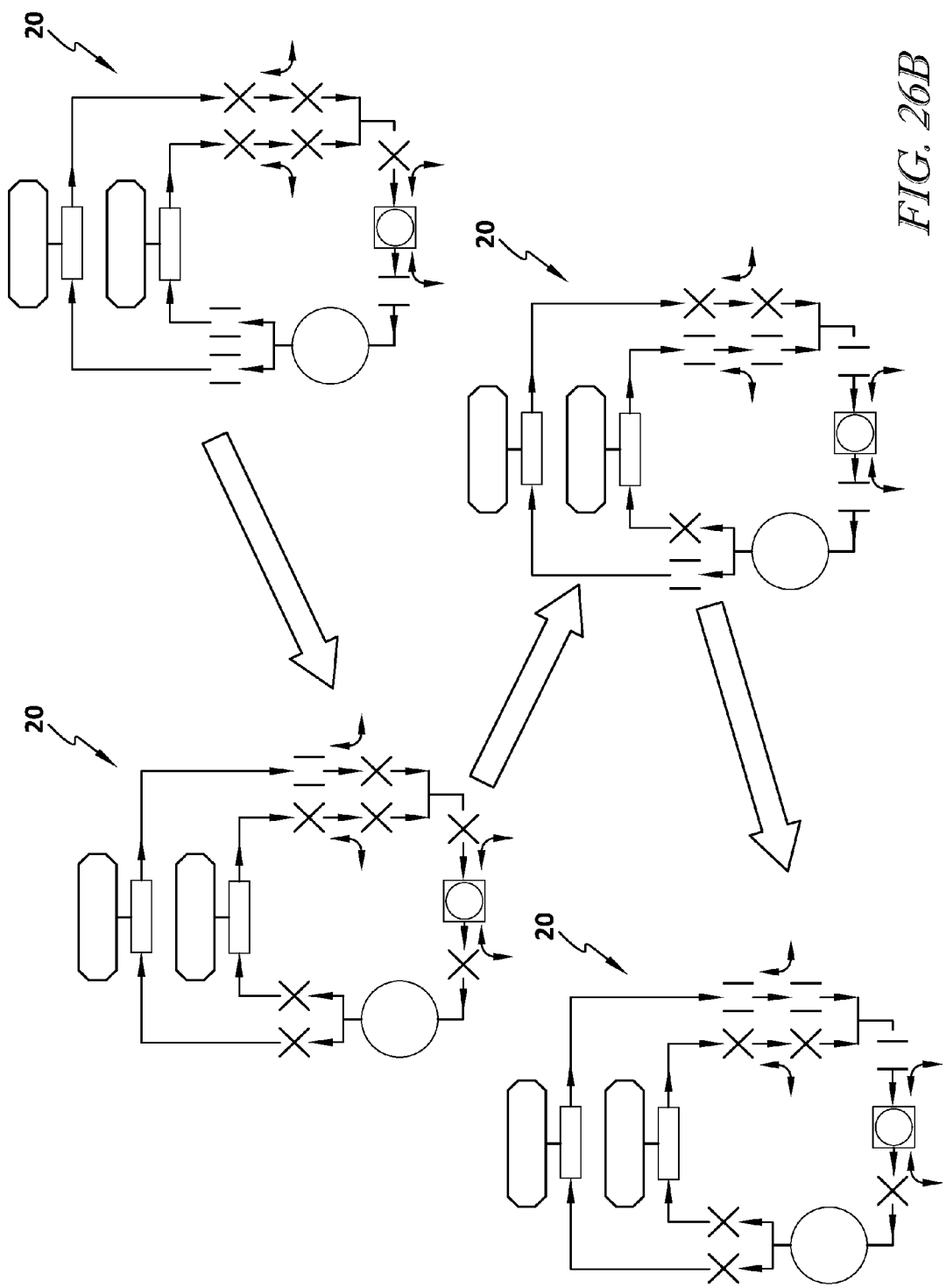
Figure 31:
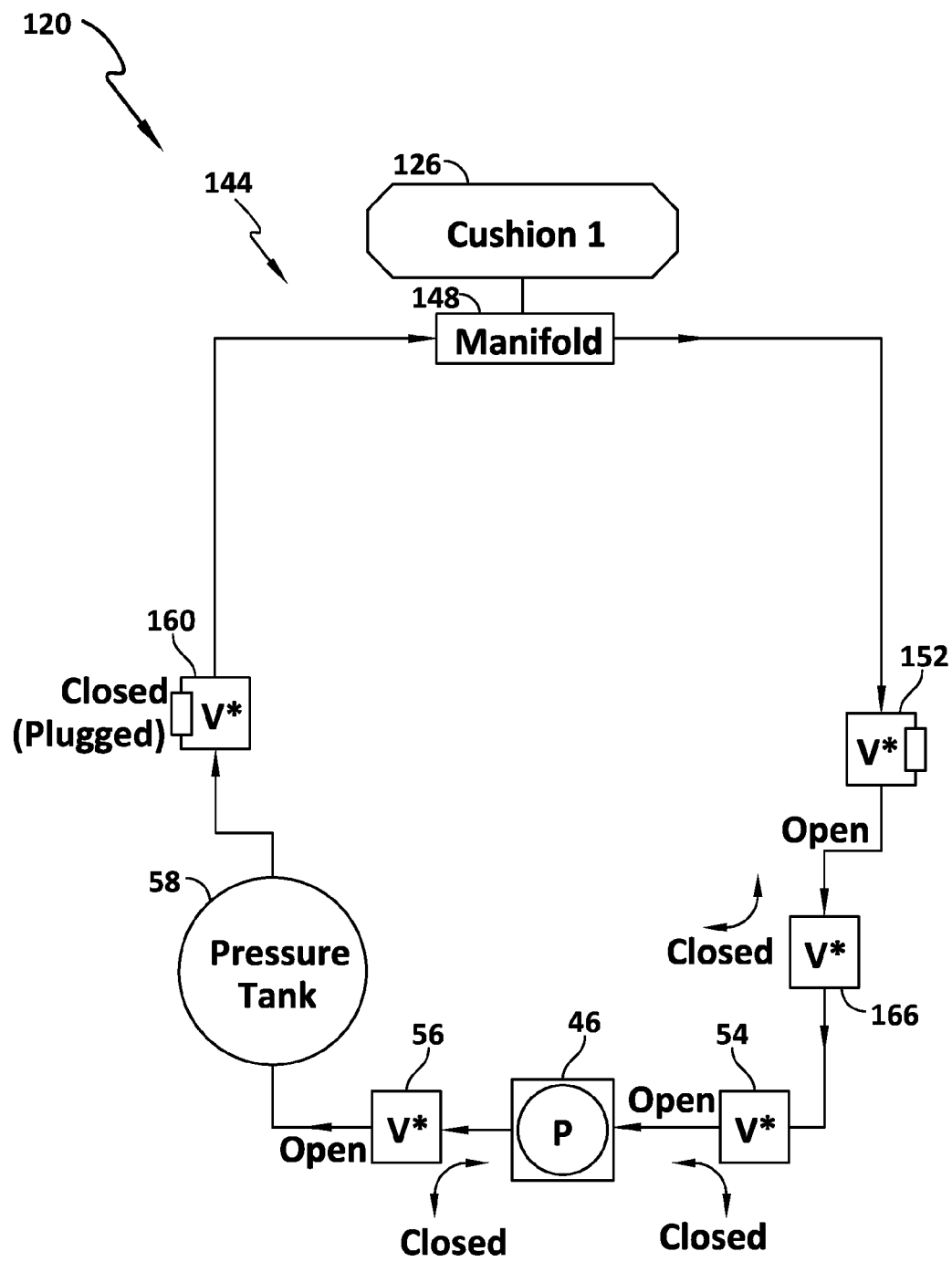
Figure 32:
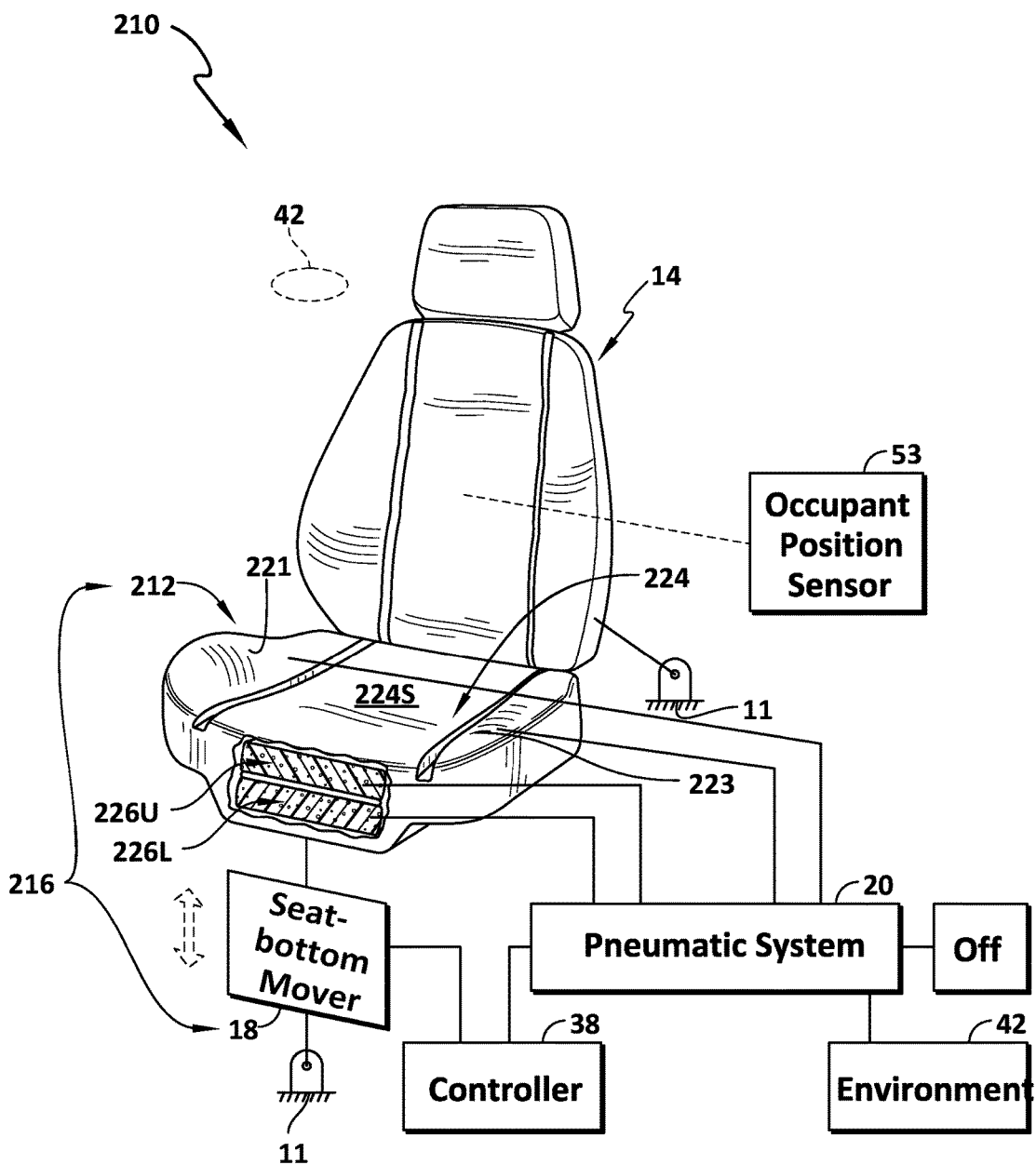
Figure 41:
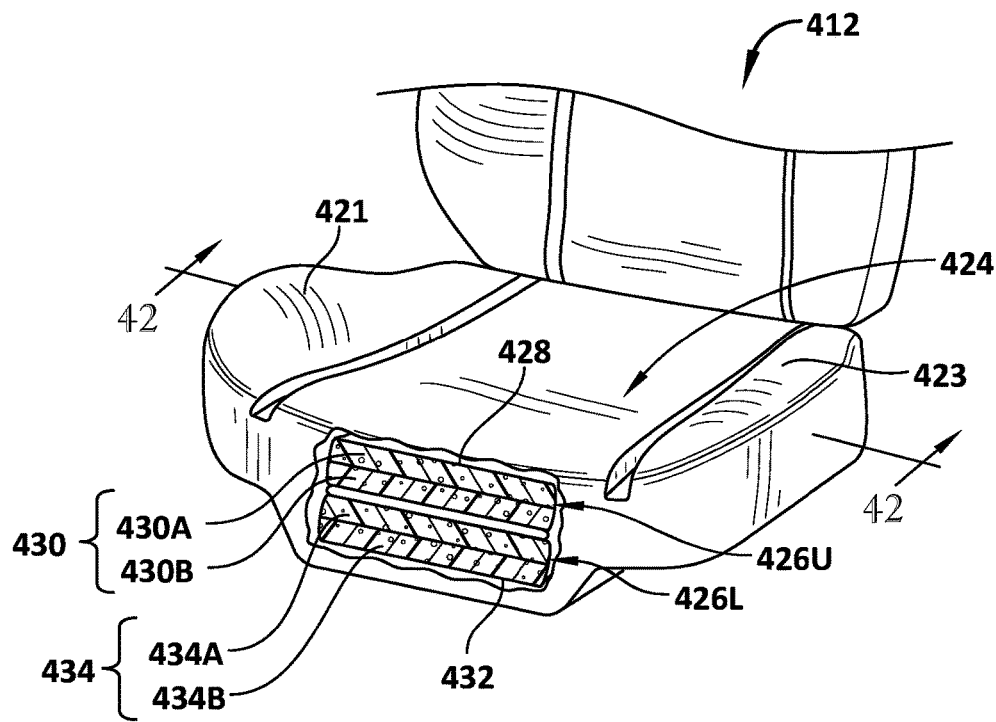
Figure 42:
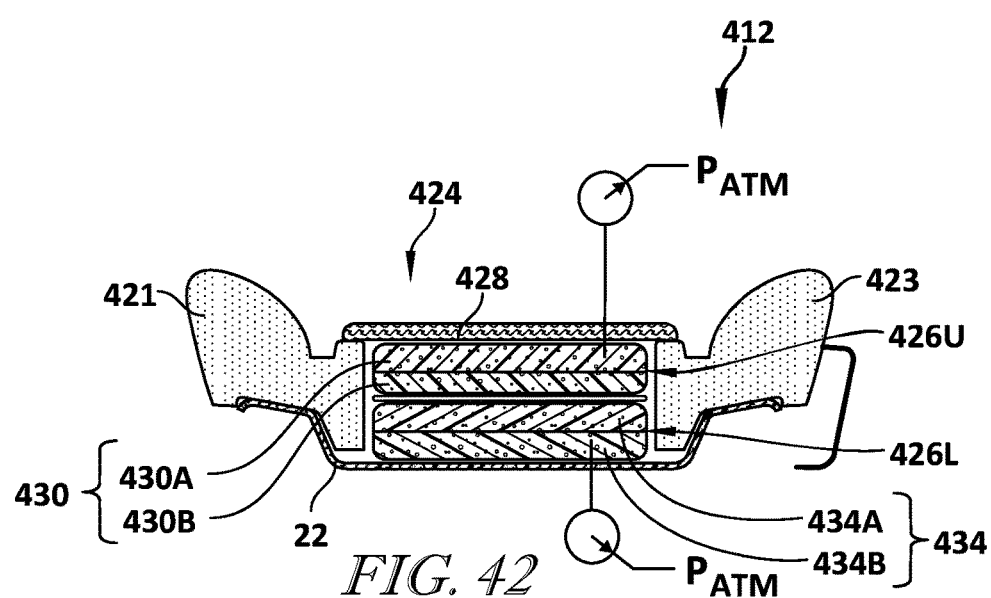
Figure 43:
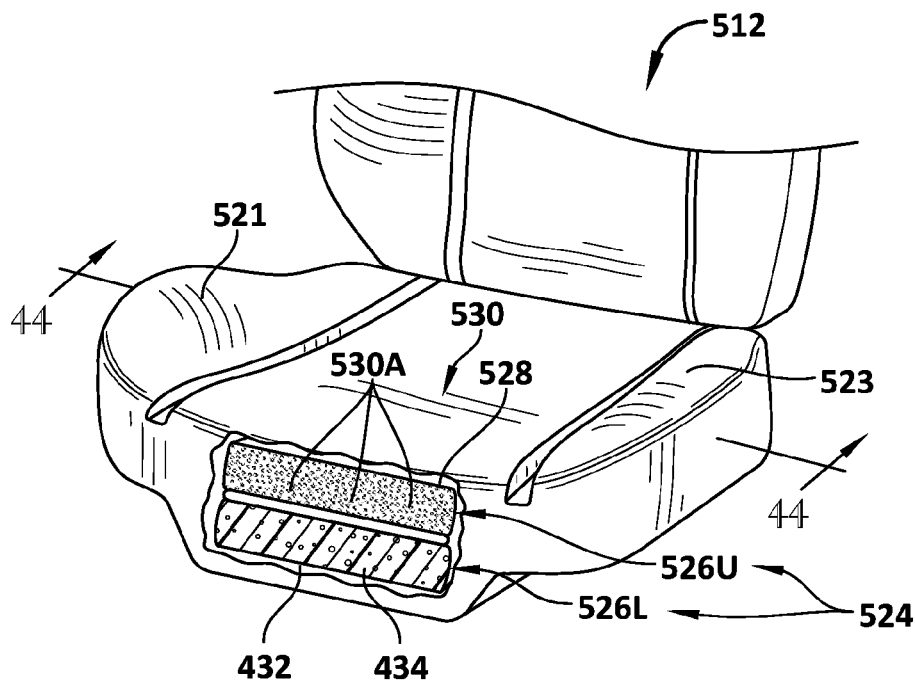
Figure 44:
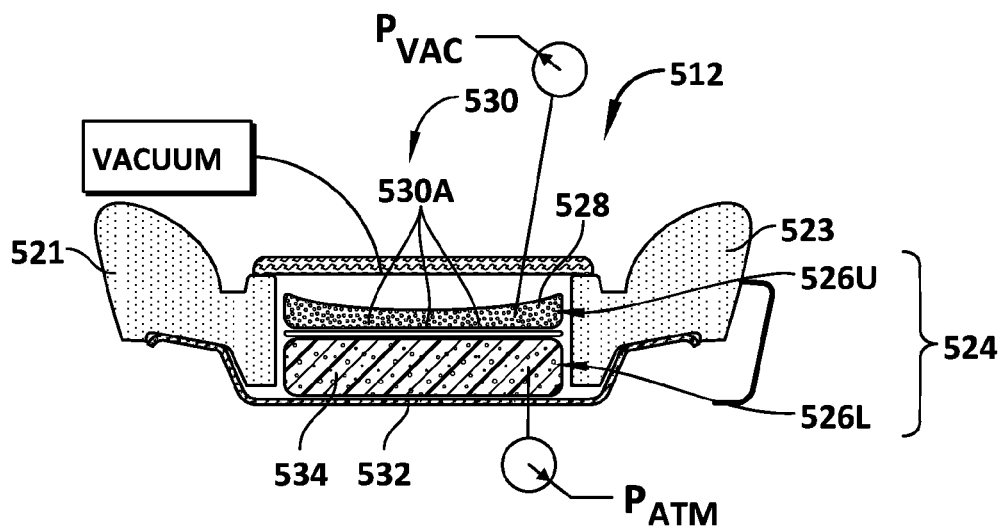
Figure 45:
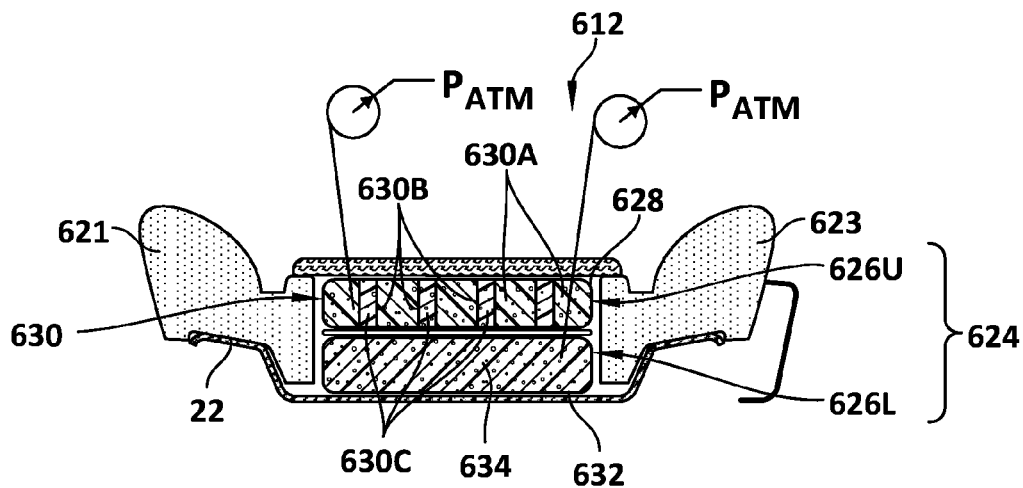
Figure 46:
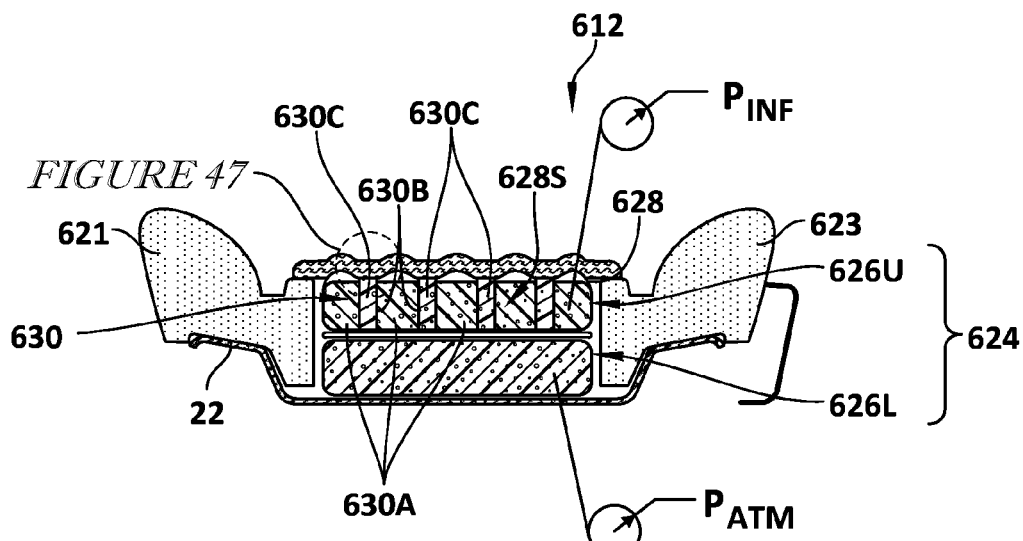
Figure 47:
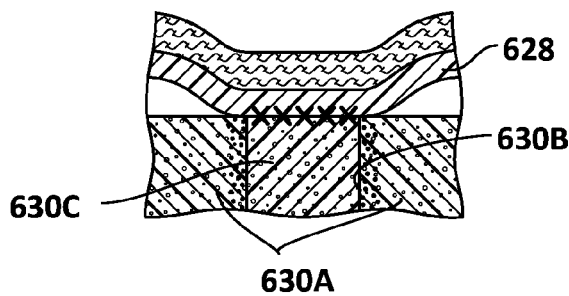
Figure 48:
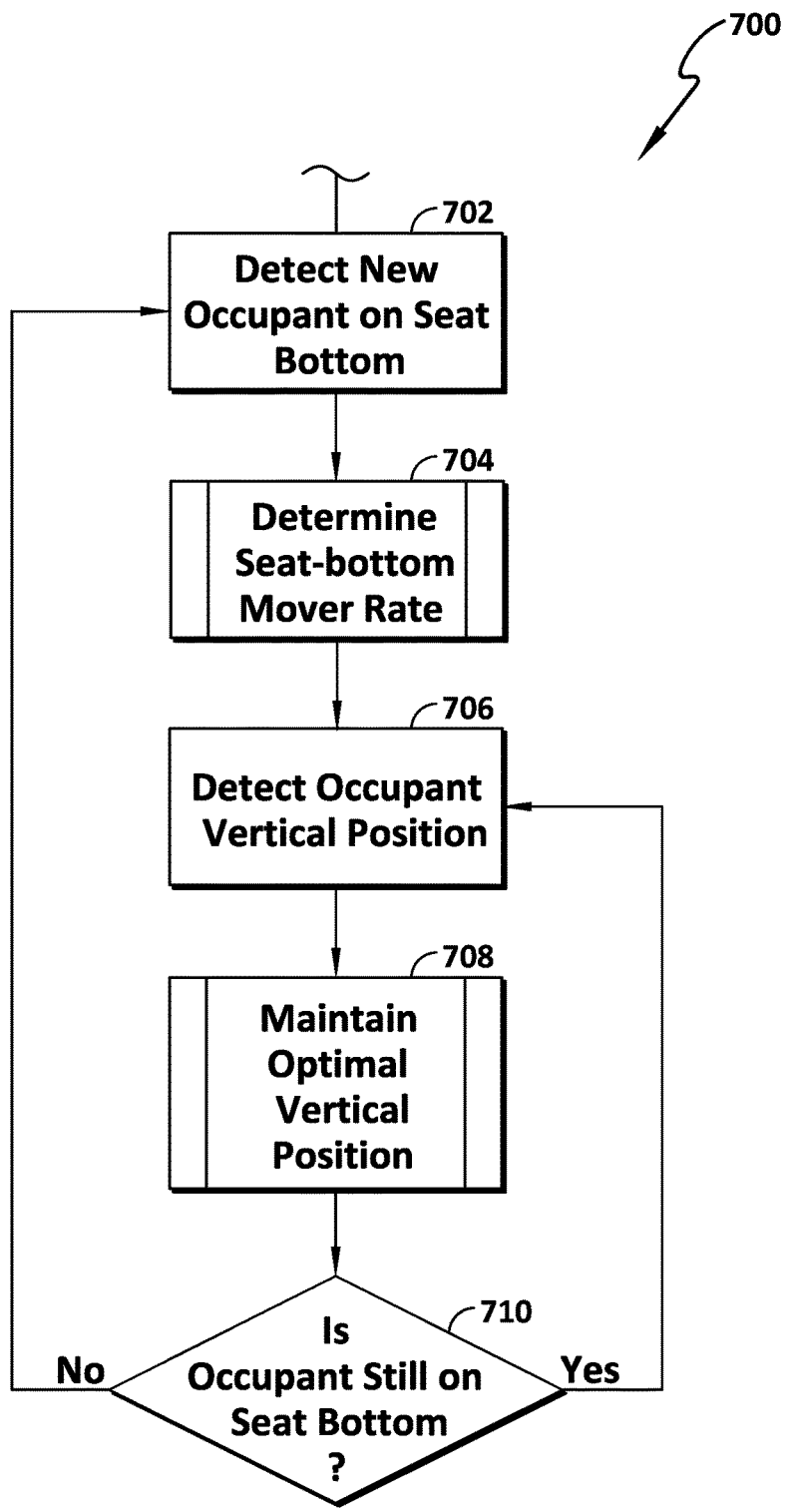
Figure 49:
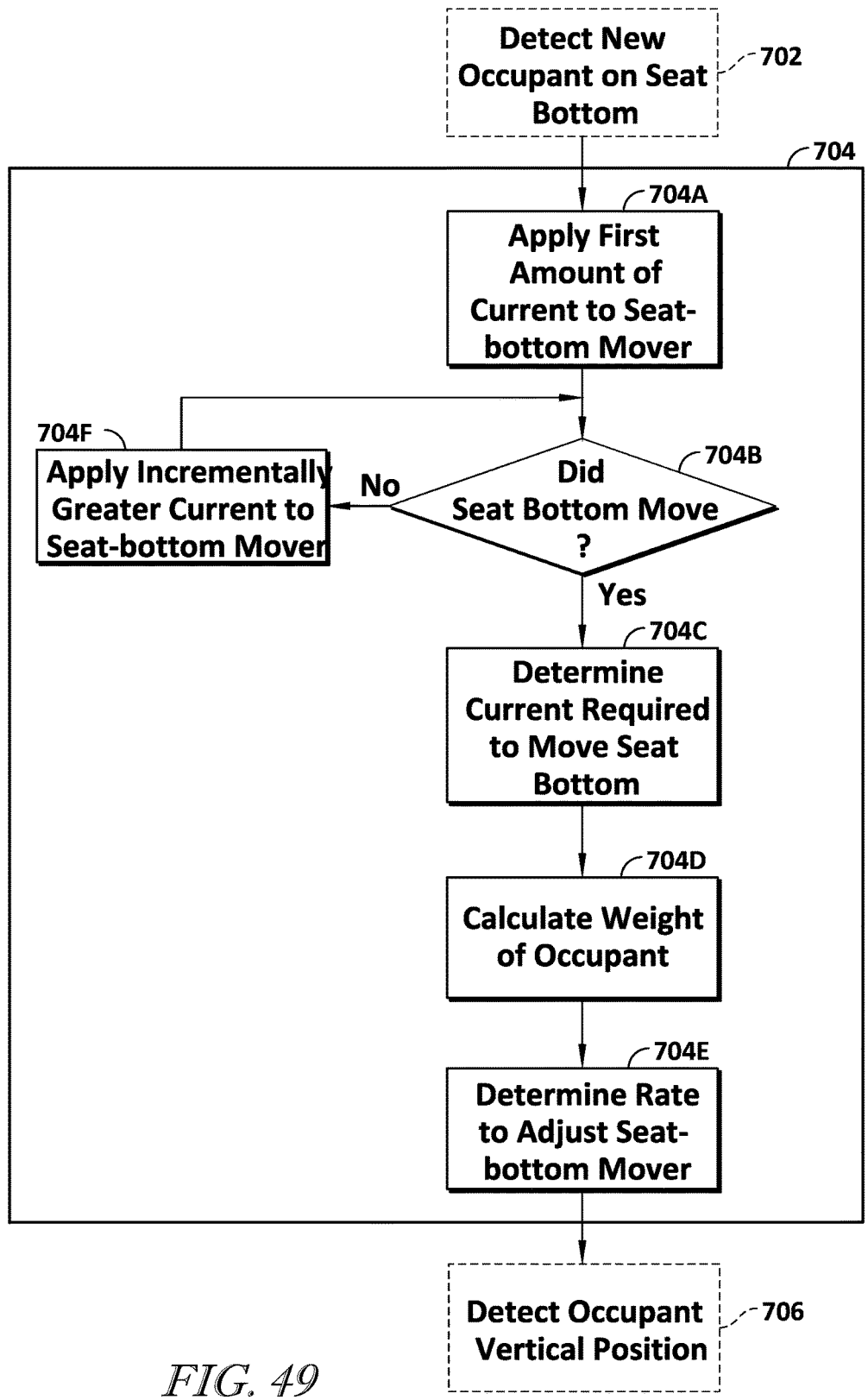
Figure 50:
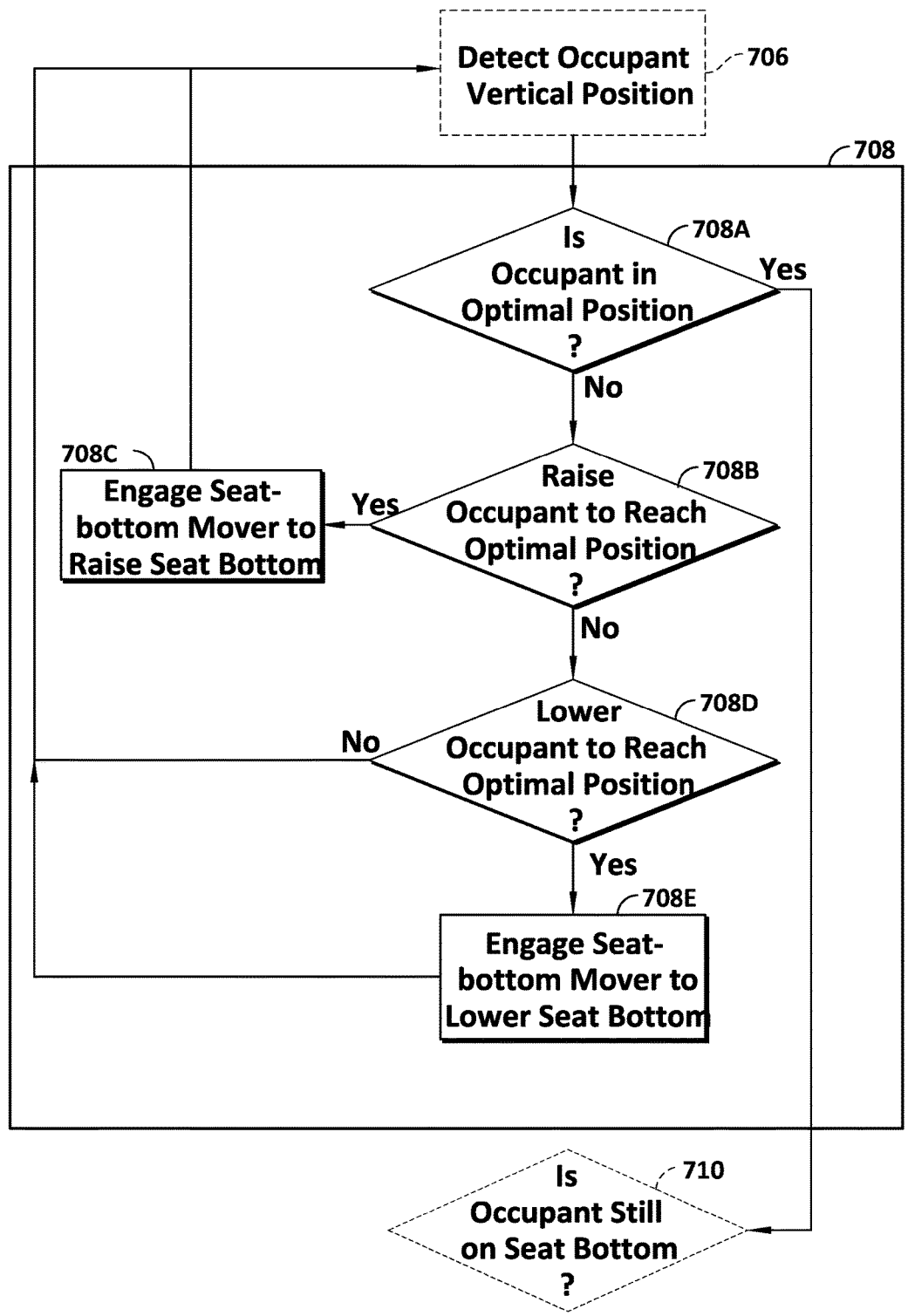

FIG. 26A is a series of elevation view showing how the upper and the lower variable-firmness cushions change as a result of operating the pneumatic system as suggested in FIG. 26B; and FIG. 26B is a series of diagrammatic view showing how the pneumatic system is changed to achieve the ingress/egress, normal-driving, fitted-driving, and performance-driving arrangements of the seat base by opening (shown as | |) and closing (shown as X) various valves included in the pneumatic system;

FIGS. 27-29 are a series of elevation views of another embodiment of a seat base in accordance with the present disclosure showing that a seat pad included in the seat base may include only a single variable-firmness cushion and that inflation of the single variable-firmness cushion may be changed to obtain the ingress/egress arrangement, the normal-driving arrangement, and the fitted-driving arrangement;

FIG. 27 is a diagrammatic and elevation view of another embodiment of a seat base in accordance with the present disclosure showing that a single variable-firmness cushion has been inflated and the seat-bottom mover has been lowered to establish an ingress/egress arrangement of the seat base;

FIG. 28 is a view similar to FIG. 27 showing that the single variable-firmness cushion has been returned to atmospheric pressure and that the seat-bottom mover has been raised to establish a normal-driving arrangement of the seat base;

FIG. 29 is a view similar to FIG. 28 showing that air in the single variable-firmness cushion has been vacuumed and that seat-bottom mover has been raised further to establish the fitted-driving arrangement of the seat base;

FIG. 30 is a plan view of a user input showing that the user input includes a first button that causes the controller to cause the seat bottom to adjust to the first position and assume the ingress/egress arrangement, a second button which causes the controller to cause the seat bottom to adjust to the normal-driving arrangement, and a third button which causes the controller to cause the seat bottom to adjust progressively toward the fitted-driving arrangement and the performance-driving arrangement;

FIG. 31 is a diagrammatic view of another embodiment of a pneumatic system in accordance with the present disclosure that is used with the seat base of FIGS. 27-29;

FIG. 32 is a perspective and diagrammatic view of another embodiment of a vehicle seat in accordance with the present disclosure showing that the vehicle seat includes a seat back, a seat bottom movable relative to the seat back, and a seat-bottom mover coupled to the seat bottom to move the seat bottom up and down relative to the seat back to cause a passenger seated on the seat bottom to be maintained at about a constant elevation relative to a vehicle frame and suggesting that a pneumatic system may be used to vary a firmness and thickness of a seat pad included in the seat bottom and vary a size of first and second bolsters included in the seat bottom;

FIGS. 33-36 are a series of elevation views of the seat base of FIG. 32 showing that the upper and lower variable-firmness cushions and the first and second bolsters included in the seat bottom may have their respective shapes varied by the pneumatic system to establish one of an ingress/egress arrangement, a normal-driving arrangement, a firm normal-driving arrangement, and a performance-driving arrangement;

FIG. 33 is a diagrammatic and elevation view of the seat base of FIG. 32 showing that both the upper and lower variable-firmness cushions have been inflated, the first and second bolsters are un-inflated, and the seat-bottom mover has been lowered to establish an ingress/egress arrangement of the seat base;

FIG. 34 is a view similar to FIG. 33 showing that both variable-firmness cushions have been returned to atmospheric pressure, both bolsters remain un-inflated, and that the seat-bottom mover has been raised to establish a normal-driving arrangement of the seat base;

FIG. 35 is a view similar to FIG. 34 showing that air has been vacuumed from the upper variable-firmness cushion to increase firmness of the seat bottom, air has been admitted to the lower variable-firmness cushion to raise the upper variable-firmness cushion relative to the seat-bottom mover, and the seat-bottom mover has remained in generally the same position to establish a firm normal-driving arrangement of the seat base;

FIG. 36 is a view similar to FIG. 35 showing that air in both the upper and lower variable-firmness cushions has been vacuumed to increase firmness of the seat bottom and to cause the upper surface of the seat pad to assume a concave shape that extends toward the seat-bottom mover while the seat-bottom mover has raised the seat bottom to establish the performance-driving arrangement;

FIGS. 37-40 are a series of elevation views of another embodiment of a seat base in accordance with the present disclosure showing that the seat base includes a seat-bottom mover and a seat pad including upper and lower variable-firmness cushions which have their respective shapes varied by a pneumatic system to provide an ingress/egress arrangement, a normal-driving arrangement, a firm normal-driving arrangement, and a performance-driving arrangement;

FIG. 37 is a diagrammatic and elevation view of the seat base showing that both the upper and lower variable-firmness cushions have been inflated and the seat-bottom mover has been lowered to establish an ingress/egress arrangement of the seat base;

FIG. 38 is a view similar to FIG. 37 showing that both the variable-firmness cushions have been returned to atmospheric pressure and the seat-bottom mover has been raised to establish the normal-driving arrangement of the seat base;

FIG. 39 is a view similar to FIG. 38 showing that pressurized air has been admitted to the upper variable-firmness cushion to maximize firmness of the upper variable-firmness cushion while air has been vacuumed from the lower variable-firmness cushion to maintain the vertical position of the occupant without movement of the seat-bottom mover so as to provide the firm normal-driving arrangement of the seat;

FIG. 40 is a view similar to FIG. 39 showing that air in both the upper and lower variable-firmness cushions has been vacuumed to increase firmness of the seat bottom and to cause the upper surface of the seat pad to assume a concave shape that extends toward the seat-bottom mover while the seat-bottom mover has raised the seat bottom upwardly to establish the performance-driving arrangement;

FIG. 41 is an enlarged partial perspective view of another embodiment of a seat bottom in accordance with the present disclosure showing that the upper variable firmness cushion includes a bladder formed to include a space therein and a first upper layer of foam and a second upper layer of foam located in the space and the lower variable-firmness cushion includes a bladder formed to include a space therein and a first lower layer of foam and a second lower layer of foam located in the space;

FIG. 42 is a sectional view taken along line 42-42 of FIG. 41;

FIG. 43 is a perspective and diagrammatic view of another embodiment of a vehicle seat in accordance with the present disclosure showing that the vehicle seat includes a seat back and a seat bottom including an upper variable-firmness cushion including a bladder and a plurality of foam spheres located in a space formed in the bladder and a lower variable firmness cushion including a bladder and a foam core located in a space formed in the bladder;

FIG. 44 is a sectional view taken along line 44-44 of FIG. 43 showing that the upper variable-firmness cushion has taken on a shape sympathetic to the occupant and the shape has been retained after the occupant has left the vehicle seat as a result of applying a vacuum to the upper variable-firmness cushion while the occupant was sitting on the vehicle seat;

FIG. 45 is an elevation view of another embodiment of a seat pad in accordance with the present disclosure showing that the seat pad includes an upper variable-firmness cushion and a lower variable-firmness cushion and that the upper variable firmness cushion includes a bladder formed to include a space therein, a foam core including a foam body formed to include a plurality of spaced-apart passageways and a plurality of pillars located in the passageways and bonded to an upper portion of the bladder and a lower portion of the bladder to block an upper surface of the seat pad from establishing a convex shape that extends upwardly when the upper variable-firmness cushion is inflated to its maximum extent as suggested in FIG. 46;

FIG. 46 is a view similar to FIG. 45 showing the upper variable-firmness bladder inflated to its maximum extent and the upper portion of the bladder assuming an undulating shape as a result of the upper portion of the bladder being bonded to the plurality of foam pillars;

FIG. 47 is an enlarged view taken from the circled region of FIG. 46 showing one of the foam pillars bonded (XXXXX) to an inner surface of the upper portion of the upper bladder;

FIG. 48 is a diagrammatic view of a vehicle-seat adjustment process in accordance with the present disclosure showing the vehicle-seat adjustment process includes a detecting operation which detects when a new occupant is on the vehicle seat, a determining sub-routine which determines a seat-bottom mover rate, a detecting operation which detects a vertical position of the occupant on the seat bottom, a maintaining operation which maintains the occupant at an optimal vertical position, and a determining operation that determines whether the occupant is still sitting on the seat bottom;

FIG. 49 is a diagrammatic view of the determining sub-routine of FIG. 48 showing that the determining sub-routine applies incrementally more current to the seat-bottom mover until the seat-bottom mover is able to move the seat bottom with the occupant sitting on the seat bottom to determine a weight of the occupant which is then used to determine a rate to move the seat bottom when the seat pad is being adjusted; and FIG. 50 is a diagrammatic view of the maintaining sub-routine of FIG. 48 showing the maintaining sub-routine determines if the occupant is in the optimal position and then commands the seat-bottom lifter to move the seat bottom up or down until the occupant is in the optimal position and then keeps the occupant in the optimal position.

DETAILED DESCRIPTION

Figure 25:
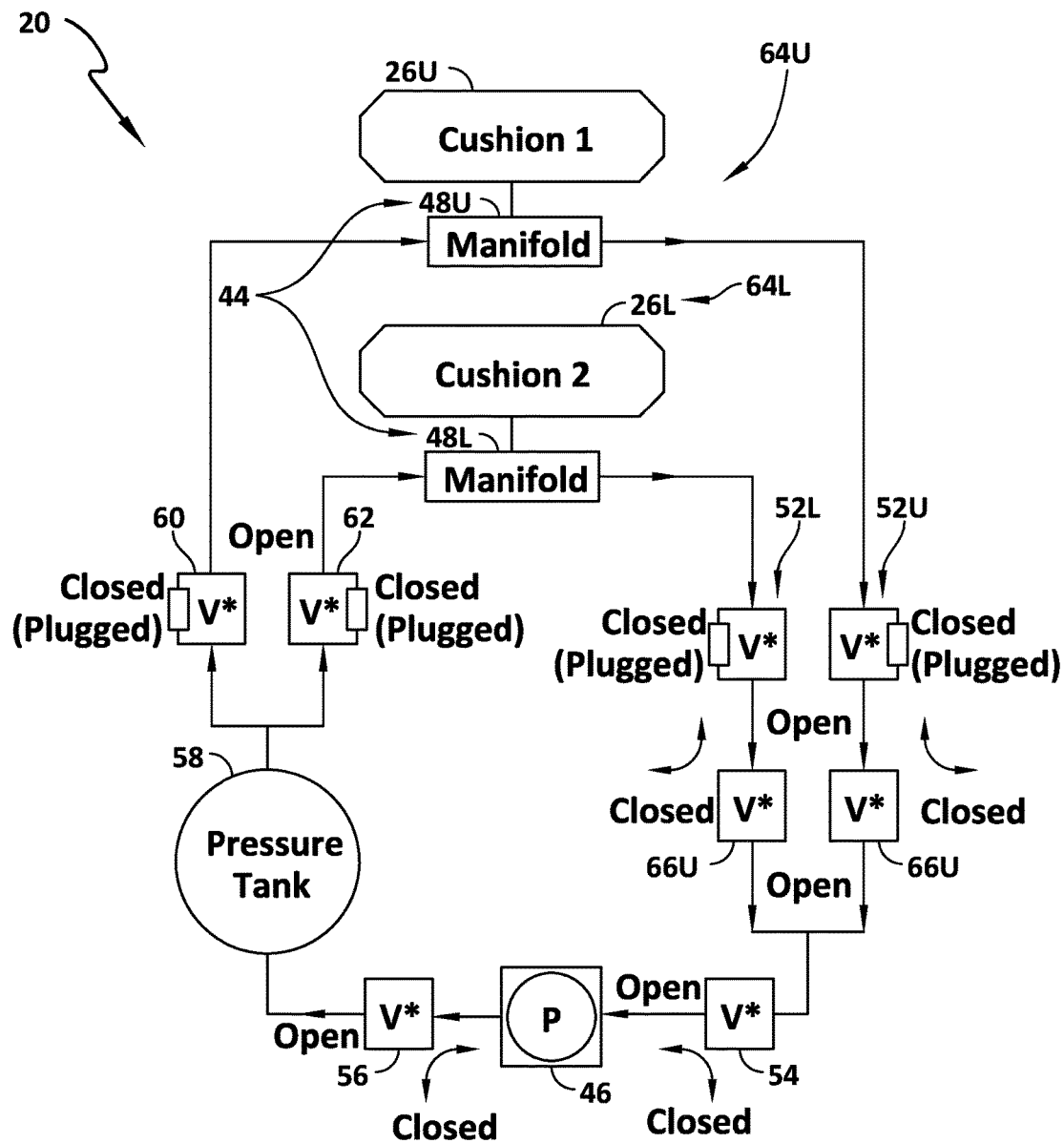
FIG. 25 is a diagrammatic view of the pneumatic system of FIG. 1 showing that the pneumatic system includes, starting at the top and moving clockwise around the diagram, upper and lower cushions coupled to associated manifolds, exhaust valves, an air pump, a pressure tank, and pressurizing valves.

A first embodiment of an occupant-support base 12 in accordance with the present disclosure is shown in FIGS. 1-20. Another embodiment of an occupant-support base 112 is shown in FIGS. 27-29. One embodiment of a pneumatic system 120 included in occupant-support base 112 is shown in FIG. 31. Still yet another embodiment of an occupant-support base 212 is shown in FIGS. 32-36. Another embodiment of an occupant-support base 312 is shown in FIGS. 37-40. Still yet another embodiment of an occupant-support base 412 is shown in FIGS. 41 and 42. Still yet another embodiment of an occupant-support base 512 is shown in FIGS. 43 and 44. Yet another embodiment of an occupant-support system base is shown in FIGS. 45-47. Another embodiment of a pneumatic system 20 included in the various occupant-support bases 12, 212, 312, 412, 512, and 612 is shown in FIGS. 25-26B. A process 700 for maintaining an occupant at an optimal height 50 above a vehicle floor 11 is shown in FIGS. 48-50.

A vehicle seat 10 in accordance with the present disclosure includes one occupant-support base 12 including a seat bottom 12 and another occupant-support base 14 including a seat back 14 as shown in FIG. 1. Occupant-support base 12 further includes a seat-bottom mover 18 that interconnects seat bottom 12 and a vehicle floor 11 included in the vehicle to cause seat bottom 12 to move up and down relative to the vehicle frame as suggested in FIG. 1. A pneumatic system 20 is coupled to seat bottom 12 to cause seat bottom 12 to assume at least one of a first arrangement (also called a normal-driving arrangement) shown in FIGS. 1, 2, 6, 12, and 22, a second arrangement (also called a fitted-driving arrangement) shown in FIGS. 7, 15, and 23, a third arrangement (also called a performance-driving arrangement) shown in FIGS. 3, 8, 18, and 24, and a fourth arrangement (also called an ingress/egress arrangement) shown in FIGS. 5, 9, and 21. Together, seat bottom 12 and seat-bottom mover 18 cooperate to establish a seat base 16 as shown in FIG. 1.

Seat bottom 12 includes a seat pan 22, a first bolster 21, a seat pad 24, and a second bolster 23 as shown in FIGS. 1-3. Seat pad 24 is coupled to seat pan 22 to move therewith and located between first and second bolsters 21, 23 (also called first and second thigh bolsters 21, 23). Seat pad 24 is configured to provide means for varying a firmness level of seat pad 24 while varying a thickness of seat pad 24 to cause at least one of the first, second, third, and fourth arrangements to be established as suggested in FIGS. 5-8 and 21-24 so that occupant-support base 12 is configured as desired by an occupant.

Figures 5, 6:
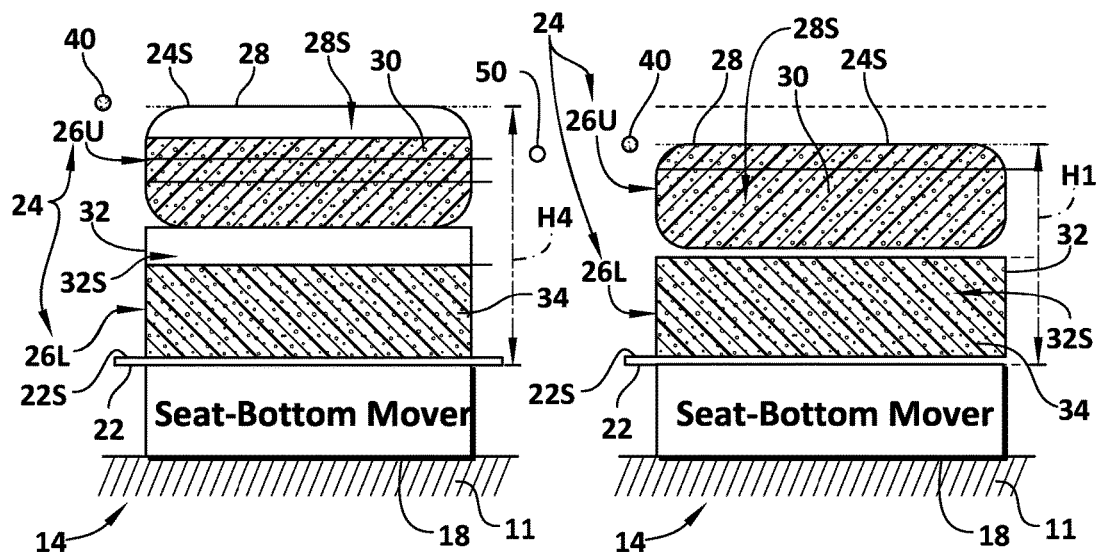
Figures 7, 8:
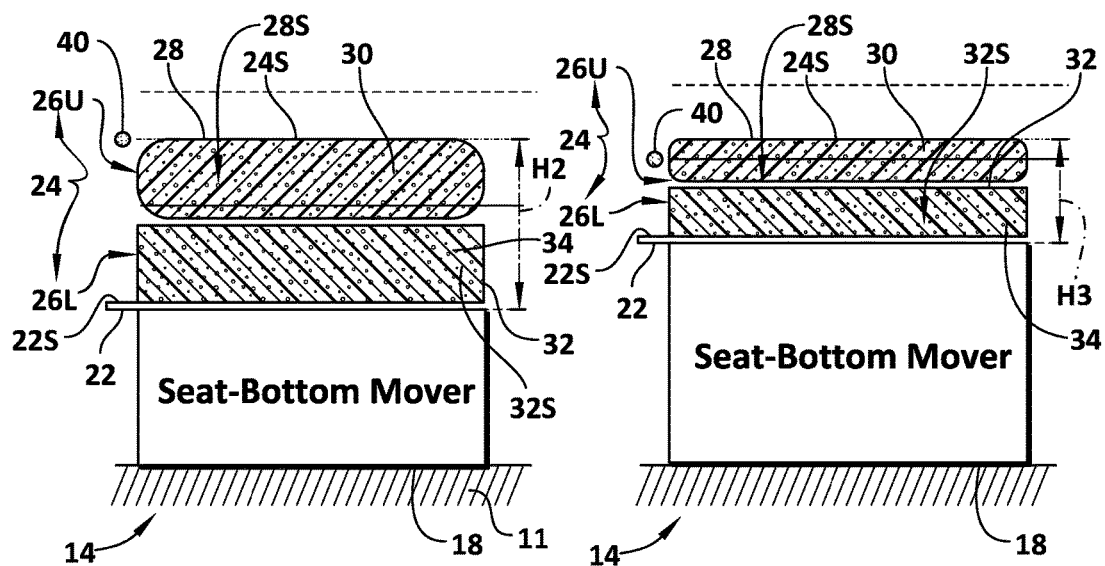
Figure 9:
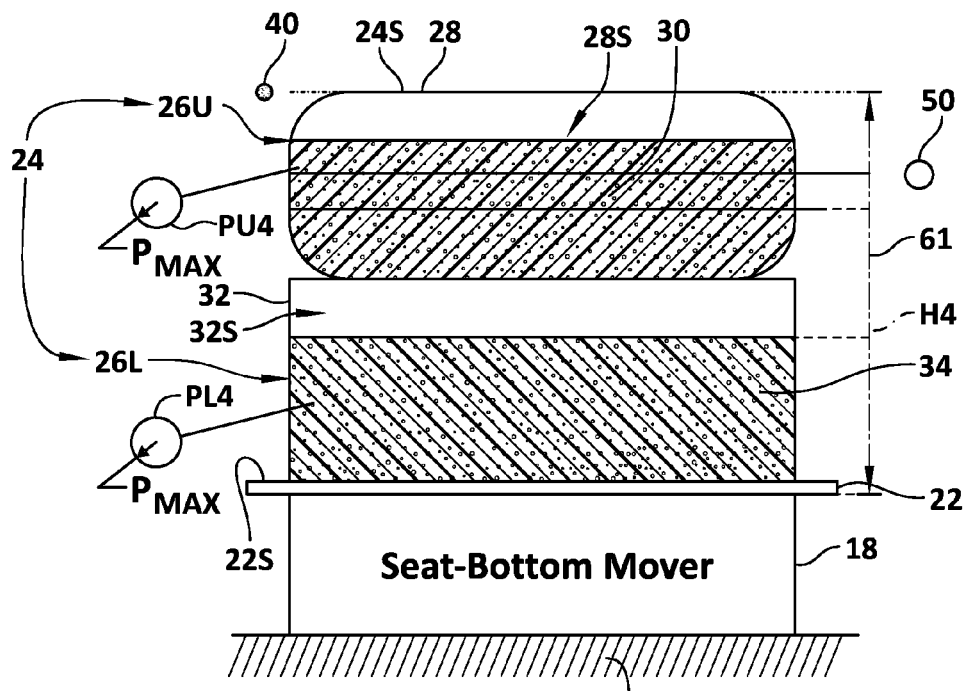
FIG. 9 is an enlarged view of FIG. 5 showing that an upper surface of the seat pad is a maximum height above the seat-bottom mover when the seat base is in the egress/ingress arrangement.
Figure 10:
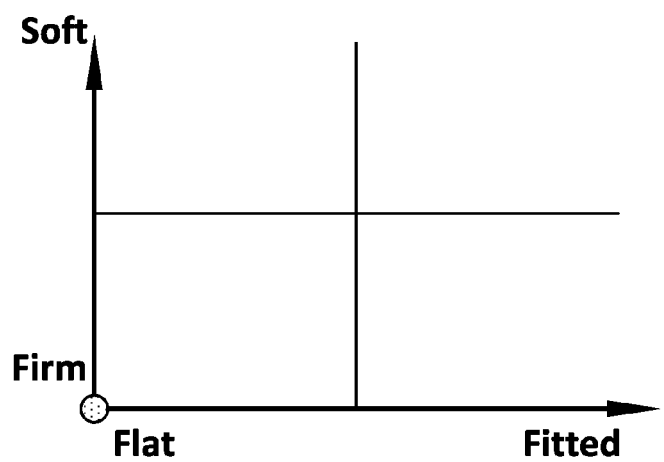
FIG. 10 is a graph showing firmness vs. fit of the seat base when the seat base is in the egress/ingress arrangement of FIG. 9 and that the seat base has a least amount of fit to an occupant and a maximum amount of firmness.
Figure 12:
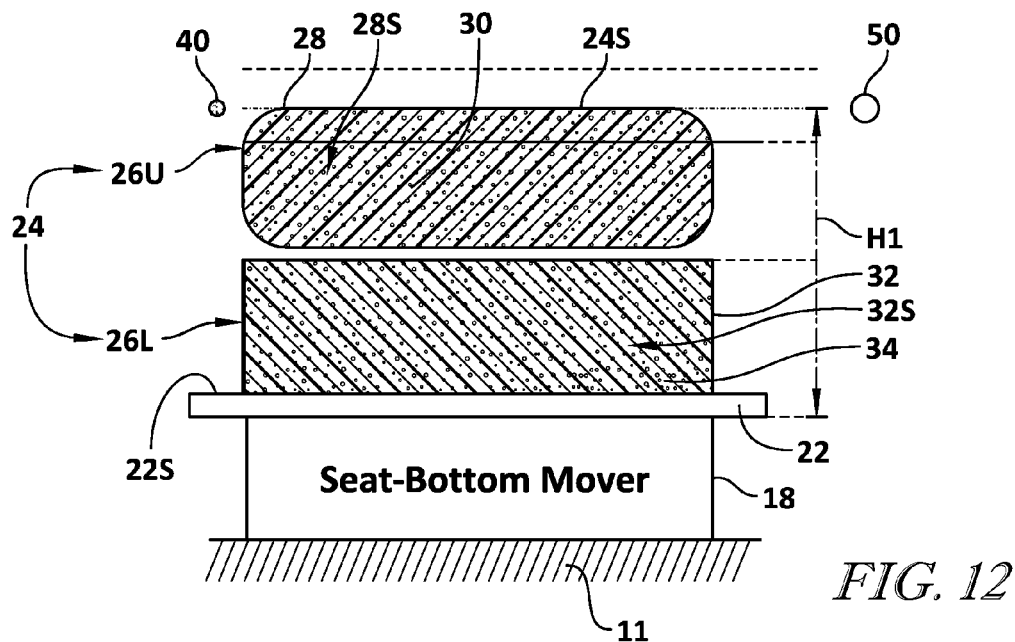
FIG. 12 is an enlarged view of FIG. 6 showing that an upper surface of the seat pad is at a relatively lesser height above the seat-bottom mover and that the seat-bottom mover has elevated the seat bottom above the vehicle floor to cause the optimal height of the occupant to be establish when the seat base is in the normal-driving arrangement.
Figure 13:
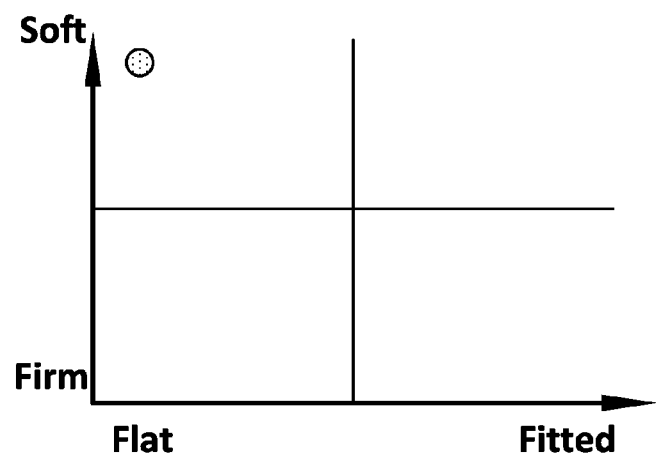
FIG. 13 is a view similar to FIG. 10 showing that when the seat base is in the normal-driving arrangement of FIG. 12 that the seat base has an increased amount of fit to an occupant and a minimum amount of firmness.
Figure 18:
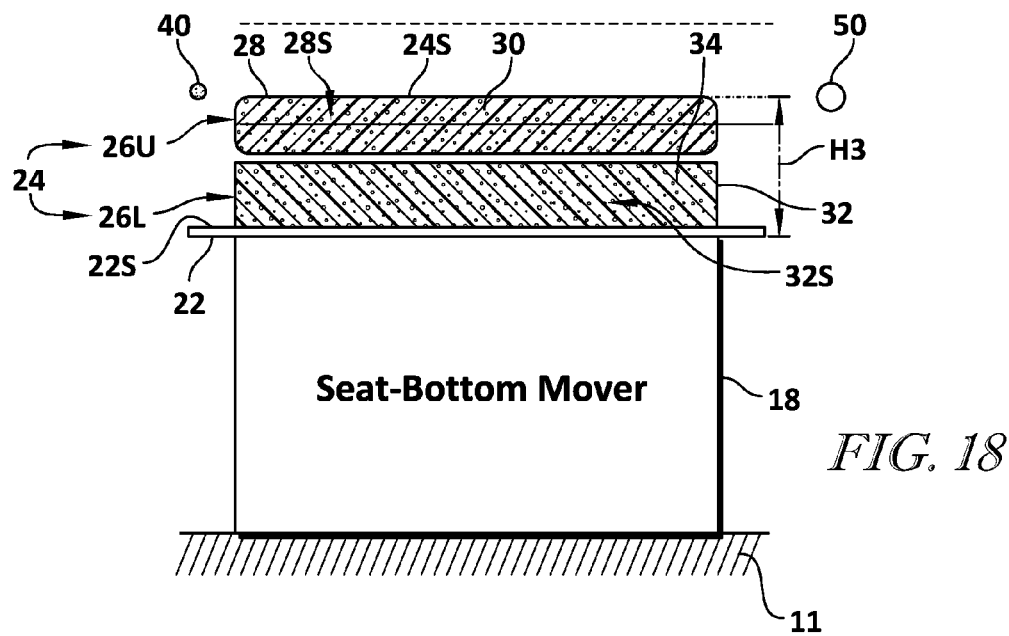
FIG. 18 is an enlarged view of FIG. 8 showing that an upper surface of the seat pad has moved to a relatively lowest position relative to the seat-bottom mover and that the seat-bottom mover has moved the seat bottom to a relatively highest position above the vehicle floor to cause the optimal height of the occupant to be maintained when the seat base is in the performance-driving arrangement.
Figure 19:
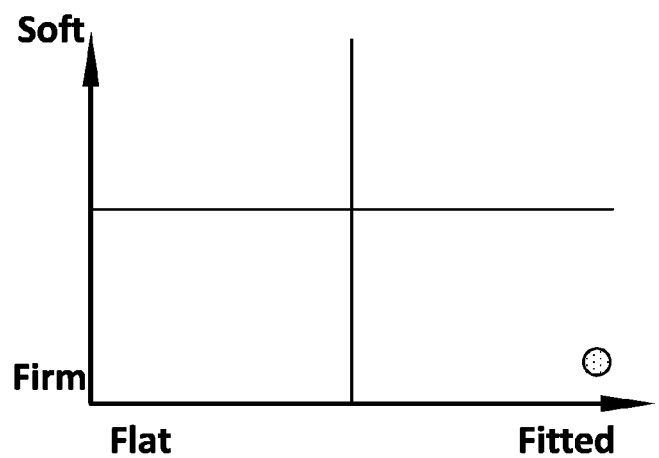
FIG. 19 is a view similar to FIG. 16 showing that when the seat base is in the performance-driving arrangement of FIG. 15, the seat base has a maximized amount of fit to an occupant and increased firmness as compared to the fitted-driving arrangement.

When seat pad 24 is in the first arrangement, a first firmness level is provided and a first thickness H1 of seat pad 24 is established. First thickness H1 (also called first height H1) is defined to be between an upper seat-pad surface 24S of seat pad 24 and an upper seat-pan surface 22S of seat pan 22 as shown in FIGS. 6 and 12. When seat pad 24 is in the second arrangement, a relatively greater second firmness level is provided and a relatively lesser second thickness H2 (also called second height H2) is provided as suggested in FIGS. 7 and 15. When seat pad 24 is in the third arrangement, a relatively greater third firmness level is provided and a relatively lesser third thickness H3 (also called third height H3) is established as shown in FIGS. 8 and 18. When seat pad 24 is in the fourth arrangement, a relatively greater fourth firmness level is provided and a relatively greater fourth thickness H4 (also called fourth height H4) is established as shown in FIGS. 5 and 8.

Seat pad 24 includes an upper cushion 26U and a lower cushion 26L as shown in FIGS. 1 and 2. Upper cushion 26U is located in spaced-apart relation above seat pan 22. Lower cushion 26L is located between upper cushion 26U and seat pan 22. Pneumatic system 20 is coupled to both upper and lower cushions 26U, 26L and is configured to supply pressurized air ($P_{INF}$, $P_{MAX}$) to inflate cushions 26U, 26L, expose cushions 26U, 26L to atmospheric pressure ($P_{ATM}$), and remove gas to establish a vacuum ($P_{VAC}$) in cushions 26U, 26L as suggested in FIGS. 21-24.

When seat pad 24 is in the first arrangement, upper cushion 26U has a first upper pressure PU1 and lower cushion 26U has a first lower pressure PL1 as shown in FIGS. 2 and 22. When seat pad 24 is in the second arrangement, upper cushion 26U has a relatively lesser second upper pressure PU2 and lower cushion 26U has first lower pressure PL1 as shown in FIG. 23. When seat pad 24 is in the third arrangement, upper cushion 26U has relatively lesser second upper pressure PU2 and lower cushion 26L has a relatively lesser second lower pressure PL2 as shown in FIGS. 3 and 24. When seat pad 24 is in the fourth arrangement, upper cushion 26U has a relatively greater third upper pressure PU3 and lower cushion 26L has a relatively greater third lower pressure PL3 as shown in FIG. 21.

In one illustrative example, first upper and lower pressures PU1, PL1 are at about atmospheric pressure ($P_{ATM}$) as suggested in FIG. 22. In comparison, relatively lesser second upper and lower pressures PU2, PU3 are less than atmospheric and referred to as a vacuum ($P_{VAC}$) as shown in FIGS. 3 and 34. Relatively greater third upper and lower pressures PU3, PL3 are greater than atmospheric pressure. In one example, relatively greater third upper and lower pressures PU3, PL3 are sufficient to inflate upper and lower cushions 26U, 26L but below a maximum inflation level. In another example, relatively greater third upper and lower pressures PU3, PL3 are at a maximum inflation level of upper and lower cushions 26U, 26L as shown in FIG. 21.

As a result of varying pressures in upper and lower cushions 26U, 26L, densities of upper and lower cushions 26U and 26L also may be varied. When seat pad 24 is in the first arrangement, upper cushion 26U has a first upper density and lower cushion 26L has a first lower density. When seat pad 24 is in the second arrangement, upper cushion 26U has a relatively greater second upper density and lower cushion 26L has the first lower density. When seat pad 24 is in the third arrangement, upper cushion 26U has the relatively greater second upper density and lower cushion 26L has a relatively greater second lower density. When seat pad 24 is in the fourth arrangement, upper cushion 26U has a relatively lesser third upper density and lower cushion 26L has a relatively lesser third lower density. In comparison, relatively lesser third upper density is less than the first upper density. Relatively lesser third lower density is less than the first lower density.

Upper cushion 26U of seat pad 24 includes a cushion bladder 28 and cushion core 30 as shown in FIGS. 2, 3, and 5-8. Cushion bladder 28 is formed to includes a space 28S therein and cushion core 30 is located in space 28S as shown in FIGS. 5-8. When seat pad 24 is in the first arrangement, cushion core 30 has a first density. When seat pad 24 is in the second arrangement, cushion core 30 has a relatively greater second density. When seat pad 24 is in the third arrangement, cushion core 30 has the relatively greater second density. When seat pad is in the fourth arrangement, cushion core 30 has the first density.

Lower cushion 26L of seat pad 24 includes a cushion bladder 32 and cushion core 34 as shown in FIGS. 2, 3, and 5-8. Cushion bladder 32 is formed to includes a space 32S therein and cushion core 34 is located in space 32S as shown in FIGS. 5-8. When seat pad 24 is in the first arrangement, cushion core 34 has a first density. When seat pad 24 is in the second arrangement, cushion core 34 has the first density. When seat pad 24 is in the third arrangement, cushion core 34 has a relatively greater second density. When seat pad is in the fourth arrangement, cushion core 30 has the first density.

In one example, cushion core 30 of upper cushion 26U is made from a material which is compressible so as to vary a density of the material. Cushion core 34 of lower cushion 26L is made from material which is compressible so as to vary a density of the material. In one illustrative example, cushion core 30 is made from a first foam material and cushion core 34 is made from a second foam material. The first foam material and the second foam material may be the same or they may be different. However, any other suitable materials may be used for cushion cores 30, 34.

While pneumatic system 20 is varying pressure in upper and lower cushions 26U, 26L, seat-bottom mover 18 operates to move seat pan 22 to cause a vertical location and orientation of seat pan 22 to vary as suggested in FIGS. 5-8. In one example, seat-bottom mover 18 is configured to maintain an occupant-reference point 40 an optimal height 50 relative to vehicle floor 11 as suggested in FIGS. 5-8. When occupant-support base 12 adjusts from the first arrangement to the second arrangement, seat-bottom mover 18 raises seat pan 22 to cause occupant-reference point 40 to be maintained relative to the seat-bottom mover 18 as shown in FIGS. 6 and 7. When occupant-support base 12 adjusts from the second arrangement to the third arrangement, seat-bottom mover 18 continues to raise seat pan 22 to maintain occupant-reference point 40 at optimal height 50. When occupant-support base 12 adjusts from any of the other arrangements to the fourth arrangement, seat-bottom mover 18 lowers seat pan 22 to provide an egress height 61 which maximizes space between occupant-support base 12 and a steering wheel included in the vehicle as suggested in FIG. 5.

In one illustrative example, occupant-reference point 40 is an H-point of the occupant. The H-point (also called hip-point) of the occupant is a theoretical relative location of an occupant's hip or the pivot point between the torso and upper leg portions of the body. In another illustrative example, occupant-reference point 40 is an eye level of the occupant (also called an eye ellipse). The eye level of the occupant is the distance above vehicle floor 11 in which an occupant's eyes are located when the occupant is looking forward.

In one example, seat-bottom mover 18 and pneumatic system 20 operate under control of a control system 36 as suggested in FIGS. 1 and 2. Control system 36 includes a controller 38, a first sensor S1, a second sensor S2, and a third sensor S3 as shown in FIG. 2. First sensor S1 is configured to detect a presence of an occupant resting on occupant-support base 12. In one example, second sensor S2 is configured to measure compression of cushion core 30, 34 in both upper and lower cushions 26U, 26L. Sensor S2 may also be configured to detect positive and negative air from pneumatic system 20 provided to cushions 26U, 26L. In another example, third sensor S3 is an occupant position sensor configured to detect a vertical position of the occupant. Third sensor S3 may be used to determine the vertical position of occupant-reference point 40 either through direct detection, calculation, and/or through estimation. Sensors S1, S2, S3 are coupled to controller 38 to provide signals to controller 38 indicative of occupant presence, occupant location, and an amount of compression in cushions 26U, 26L. Controller 38 uses those signals to control both pneumatic system 20 and seat-bottom mover 18.

Figure 11:
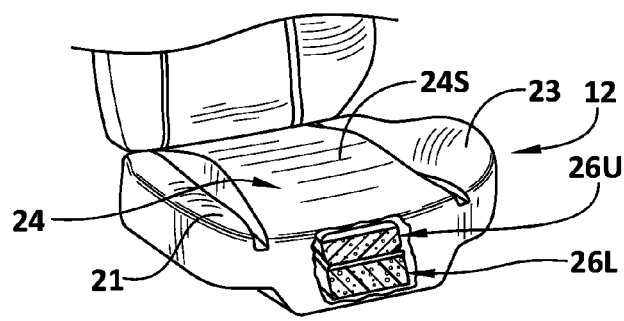
FIG. 11 is a partial perspective view of the seat base of FIG. 1 in the egress/ingress arrangement showing that the upper surface of the seat pad has assumed a convex shape extending upwardly from the seat-bottom mover.

In an example of use, controller 38 commands pneumatic system 20 to assume the ingress/egress arrangement as a result of sensing from sensor S1 that an occupant is about to enter occupant-support base 12. Controller 38 may make this determination by receiving information from the vehicle such as that a door has opened or the vehicle has unlocked. As a result, pneumatic system 20 provides pressurized air to upper and lower cushions 26U, 26L to cause cushions 26U, 26L to inflate to their maximum size causing seat bottom 12 to move to the fourth arrangement. When seat bottom 12 is in the fourth arrangement, seat pad 24 has fourth thickness H4 defined between upper seat-pad surface 24S and upper seat-pan surface 22S. When seat bottom 16 is in the fourth arrangement, upper seat-pad surface 24S has a convex shape extending upwardly away from seat pan 22 as shown in FIG. 11.

In one example, occupant sensor S1 may be a Faurecia SBR device, a bend sensor, a pressure sensor, an airbag occupant detection sensor, or any other suitable device. Compression monitor S2 may be a string potentiometer, an RF distance sensor, electromagnetic field detection, sonar (send/receive system), conductivity variation, or any other suitable alternative. Occupant-position sensor S3 may be a potentiometer coupled to seat back 14 to determine a position of the occupant along seat back 14. Occupant-position sensor S3 may also be optical, radar, capacitive, pressure, or any other suitable device.

Figure 14:
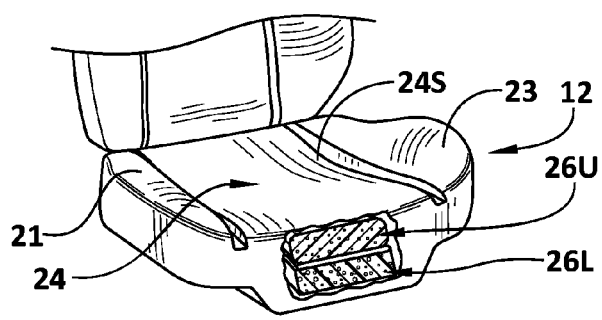
FIG. 14 is a view similar to FIG. 11 of the seat base in the normal-driving arrangement showing that the upper surface of the seat pad has assumed a generally flat shape between the first and second bolsters.

In another example of use, controller 38 commands pneumatic system 20 to assume the first arrangement (also called the normal-driving arrangement). As a result, pneumatic system 20 opens valves included in pneumatic system 20 and exposes cushion cores 30, 34 of cushions 26U, 26L to environment 42 causing seat bottom 12 to move to the first arrangement as shown in FIGS. 1, 6, 9, and 22. As a result, an occupant's weight compresses each cushion core 30, 34 as a result of gravity. At least second sensor S2 measures the amount of compression and sends a signal to controller 38 where controller 38 identifies this state as nominal for later use. When seat bottom 12 is in the first arrangement, seat pad 24 has relatively lesser first thickness H1 and upper seat-pad surface 24S has a generally flat shape as shown in FIG. 14.

Figure 15:
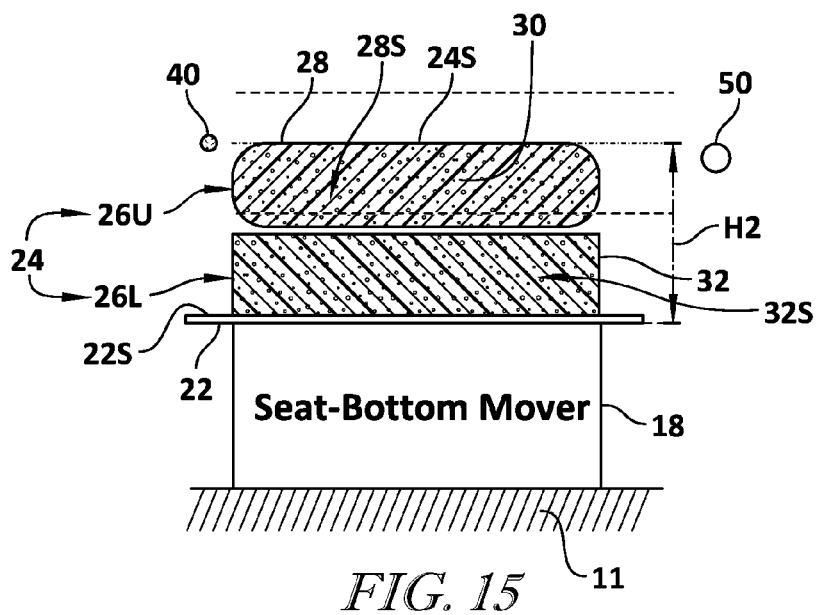
FIG. 15 is an enlarged view of FIG. 7 showing that an upper surface of the seat pad had continued to move lower relative to the seat-bottom mover and that the seat-bottom mover has continued to raise the seat bottom above the vehicle floor to cause the optimal height of the occupant to be maintained when the seat base is in the fitted-driving arrangement.
Figure 16:
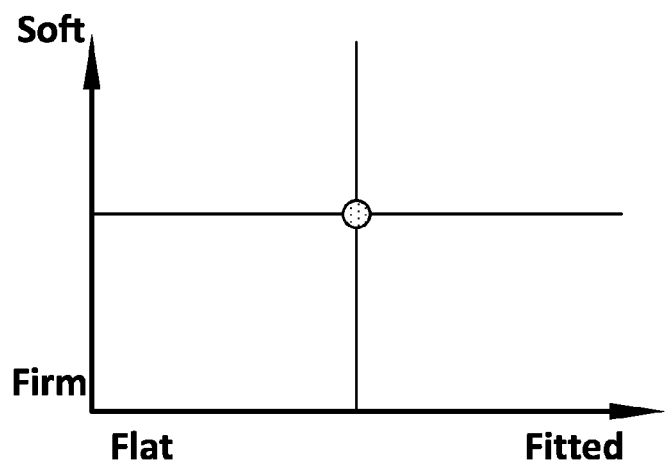
FIG. 16 is a view similar to FIG. 13 showing that when the seat base is in the fitted-driving arrangement of FIG. 15 that the seat base has a still greater amount of fit to an occupant and a relatively greater amount of firmness.
Figure 17:
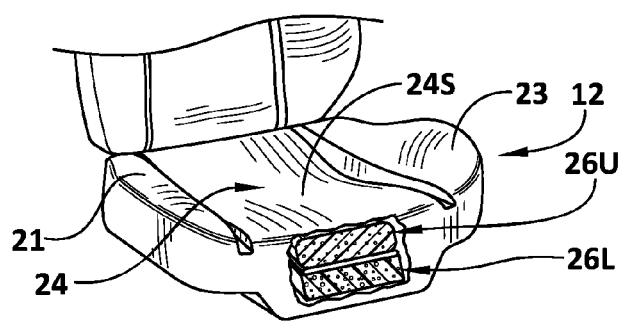
FIG. 17 is a view similar to FIG. 14 of the seat base in the fitted-driving arrangement showing that the upper surface of the seat pad has assumed a shallow concave shape that extends downwardly toward the seat-bottom mover.

In another example of use, controller 38 commands pneumatic system 20 to assume the second arrangement (the fitted-driving arrangement). As a result, pneumatic system 20 vacuums pressurized air from cushions 26U, 26L causing cushion cores 30, 34 to be compressed by cushion bladders 28, 32 and seat bottom 12 to move to the second arrangement as shown in FIGS. 7, 15, and 23. As a result, the occupant is supported by cushion 26U, 26L having a higher density. At least second sensor S2 measures the amount of compression and sends a signal to controller 38 to cause controller 38 to command pneumatic system 20 to stop applying the vacuum when sufficient compression is achieved. When seat bottom 12 is in the second arrangement, seat pad 24 has a relatively lesser second thickness H2 and has a shallow concave shape that extends downwardly toward seat-bottom mover 18 as shown in FIG. 17.

Figure 20:
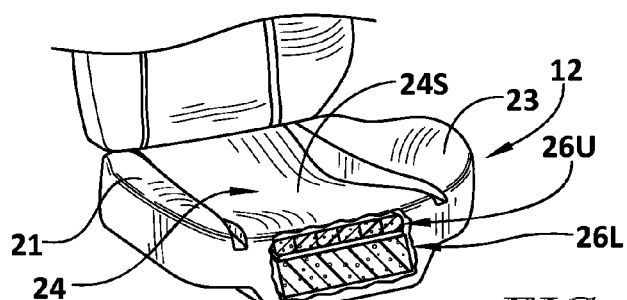
FIG. 20 is a view similar to FIG. 17 of the seat base in the performance-driving arrangement showing that the upper surface of the seat pad has assumed a deeper concave shape that extends downwardly toward the seat-bottom mover.

In still yet another example of use, controller 38 commands pneumatic system 20 to assume the third arrangement (the performance-driving arrangement). As a result, pneumatic system 20 continues to vacuum air from cushions 26U, 26L causing cushion cores 30, 34 to be compressed further and seat bottom 12 to move to the third arrangement as shown in FIG. 18. As a result, the occupant is supported by cushion cores 30, 34 having a relatively higher density. At least second sensor S2 measures the amount of compression and sends a signal to controller 38 where controller 38 commands pneumatic system 20 to stop removing air when sufficient compression is achieved. When seat bottom 12 is in the third arrangement, seat pad 24 has a relatively lesser third thickness H3 and has a concave shape extending downwardly toward seat-bottom mover 18 as shown in FIG. 20.

Controller 38 cooperates with pneumatic system 20 and seat-bottom mover 18 to maintain an elevation of the occupant relative to the vehicle floor 11. In an example of use, controller 38 instructs pneumatic system 20 to remove pressurized air from cushions 26U, 26L to cause upper surface 24S of seat pad 24 to move down relative to seat pan 22 so that the first, second, and third arrangements are established. To maintain the occupant at generally the same elevation relative to vehicle floor 11, controller 38 also commands seat-bottom mover 18 to move seat bottom 12 upward at a seat-bottom mover rate which is about the same rate that pneumatic system 20 lowers upper surface 24S. As a result, the vertical location of occupant-reference point 40 remains generally unchanged and occupant has no noticeable change relative to the vehicle interior, dashboard, controls, and vehicle mirrors.

Controller 38 may be coupled to a user input 68 as shown in FIG. 30. User input 68 includes a first button 70, a second button 72, and a third button 74. In an example of use, the occupant presses first button 70 to cause controller 38 to command seat bottom 12 to move to the ingress/egress arrangement. When the occupant presses second button 72, controller 38 commands seat bottom 12 to move to the first arrangement. When the occupant presses third button 74, controller 38 commands seat bottom 12 to move progressively toward the second and third arrangements.

In one example, controller 38 may be an Electronic Control Unit (ECU) to coordinate movement of the various systems in a vehicle. Switching between firmness modes could be LIN to the seat or integrated with vehicle level Controller Area Network (CAN). Controller 38 includes a power source, memory, and a processor. The processor is coupled to the memory and the power source and configured to execute instructions stored in memory and store values for future use in memory such as the seat-bottom mover rate.

Figure 4:
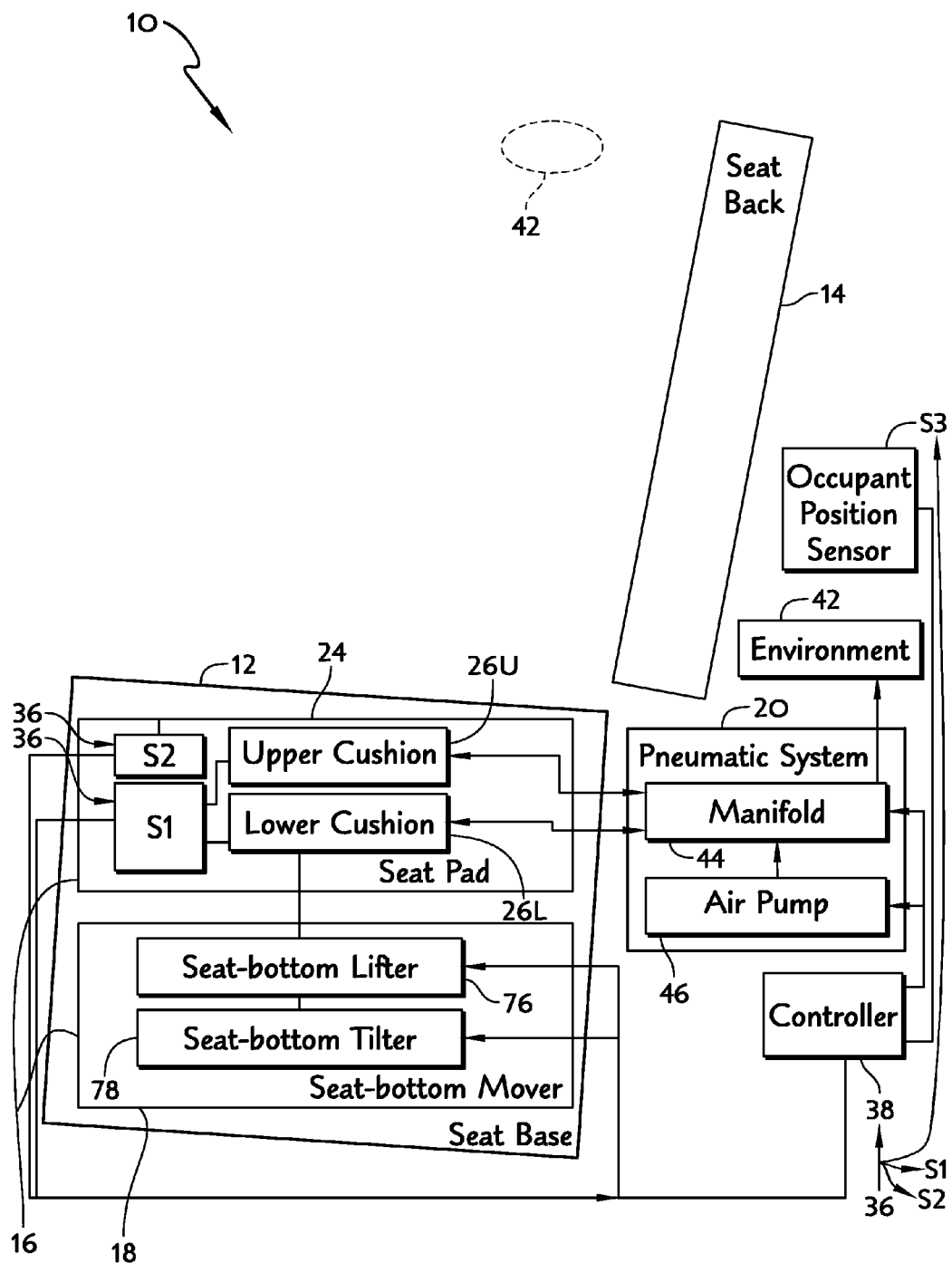

Seat-bottom mover 18 includes a seat-bottom lifter 76 and a seat-bottom tilter 78 as shown, for example, in FIG. 4. Seat-bottom lifter 76 interconnects the vehicle floor 11 and seat bottom 12 to change an elevation of seat bottom 12 relative to the vehicle floor 11. Seat-bottom tilter 78 interconnects vehicle floor 11 and seat bottom 12 to tilt seat bottom 12 relative to the vehicle floor 11. In one example, controller 38 commands seat-bottom lifter 76 to compensate for changes made to seat bottom 12 by pneumatic system 20. In another example, controller 38 commands seat-bottom tilter 78 to compensate for changes made to seat bottom 12 by pneumatic system 20. In still yet another example, controller 38 commands both seat-bottom lifter 76 and seat-bottom tilter 78 to compensate for changes made to seat bottom 12 by pneumatic system 20.

In another example of use, an occupant presses and holds third button 74 which causes controller 38 to move occupant-support base 12 toward the third arrangement (the performance-driving arrangement). Air pump 46 begins vacuuming out air in upper and lower cushions 26U, 26L compressing cushion cores 30, 34 beyond the amount applied by gravitational pull of the occupant. When a pre-determined amount of compression is sensed, for example, by the second sensor S2, air pump 46 will stop vacuuming and valves 52L, 52U, 60, 62 will close to maintain the new amount of artificial compression. As the air is drawn out of cushions 26U, 26L, the compression monitor measures the sinking distance of the occupant. This information is sent to controller 38 which then commands seat-bottom lifter 76 to raise seat bottom 12 at the same rate and distance as the sinking resulting in neutral change in the occupant's height within the vehicle.

In a further example, when seat bottom 12 is in the third arrangement (the performance-driving arrangement), the tilt of seat bottom 12 may be changed by the seat-bottom tilter 78 to change a thigh angle of the occupant. The thigh angle is measured between the horizontal and a thigh of the occupant. As the thigh angle increases, the front of seat bottom 12 may be raised or the back of seat bottom 12 may be lowered.

In another example of use, an occupant presses the second button 72 which causes controller 38 to issue commands to seat-bottom mover 18 and pneumatic system 20 that cause occupant-support base 12 to assume the first arrangement (the normal-driving arrangement). As a result, air pump 46 adds pressurized air to cushions 26U, 26L until one of the sensors determines that the occupant has now returned to the original recorded setting. Once the system equalizes, the valves 52L, 52U will open cushions 26U, 26L to atmosphere. As seat bottom 12 moves from one of the other arrangements to the first arrangement, seat-bottom lifter 78 again compensates for the change in height but in the reverse direction. Also, the thigh angle may decrease as well.

In still yet another example, the occupant opens a vehicle door causing controller 38 to command air pump 46 to begin pumping air into cushions 26U, 26L to lift the occupant making it easier to get over thigh bolsters 21, 23. Air pump 46 will stop inflating and the valves 60, 62, 52L, 52U will close to maintain the fourth arrangement (the ingress/egress arrangement) once one of the sensors determines upper surface 24S of seat pad 24 reaches thickness H4. Seat bottom 12 may also be lowered by seat-bottom lifter 76 and tilted by seat-bottom tilter 78 to provide an ingress/egress angle which aids the occupant during ingress or egress.

Controller 38 is configured to execute a vehicle-seat adjustment process 700 as shown in in FIG. 48. Vehicle-seat adjustment process 700 begins with an operation 702 in which the presence of an occupant is detected. Vehicle-seat adjustment process 700 then proceeds to a sub-routine 704 in which the seat-bottom mover rate is determined. Next, vehicle-seat adjustment process 700 proceeds to an operation 706 in which a vertical position of the occupant is detected. Vehicle-seat adjustment process 700 then proceeds to a sub-routine 708 in which an optimum position of the occupant is maintained. Vehicle-seat adjustment process 700 then proceeds to a determination operation 710 which determines if the occupant is still on occupant-support base 12. If the occupant is still on occupant-support base 12, process 700 returns operation 706. If the occupant has left occupant-support base 12, process 700 returns to operation 702 as shown in FIG. 48.

During operation 702, at least one of sensors S1, S2, S3 detects an occupant sitting on occupant-support base 12. Controller 38 receives a signal from one of sensors S1, S2, and S3 and then proceeds to sub-routine 704 as shown in FIG. 48.

Sub-routine 704 includes a set of processes which are used to determine the seat-bottom mover rate as well as a weight of the occupant. Sub-routine 704 begins an operation 704A in which controller 38 commands that a first amount of current be applied to seat-bottom mover 18. Sub-routine 704 then proceeds to a determination operation 704B in which determines whether seat-bottom mover 18 was able to move seat bottom 12 and the occupant resting thereon. If seat-bottom mover 18 was not able to move the occupant, sub-routine 704 proceeds to an operation 704F which applies an incrementally greater amount of current to seat-bottom mover 18 and then returns to determination operation 704B. Once seat-bottom mover 18 moves, sub-routine 704 proceeds to an operation 704C which determines a minimum amount of current used to move seat-bottom mover 18. Controller 38 then proceeds to operation 704D in which controller uses the minimum amount of current to determine a weight of the occupant. Weight may be determined through a calculation using the minimum amount of current, a look-up in a table stored in controller 38, or any other suitable alternative. Sub-routine 704 then proceeds to an operation 704E in which the weight of the occupant is used to determine the seat-bottom mover rate.

Once sub-routine 704 is complete, process 700 proceeds to operation 706 in which the occupant's vertical position is detected. During operation 706, controller 38 receives a signal from occupant-positions sensor S3. The signal provides controller information about the vertical location of the occupant relative to vehicle floor 11.

After operation 706 is complete, process 700 proceeds to sub-routine 708 in which the optimal position of the occupant is maintained. Sub-routine 708 beings with a determination operation 708A which determines whether the occupant is in the optimal position in vehicle seat 10 using at least one of sensors S1, S2, and S3. If the occupant is in the optimal position, sub-routine 708 terminates and process 700 proceeds to determination operation 710 as shown in FIG. 50. If the occupant is not in the optimal position, sub-routine 708 proceeds to determination operation 708B which determines if the occupant should be raised. If the occupant should be raised, sub-routine 708 proceeds to an operation 708C in which controller 38 commands seat-bottom mover 18 to raise the occupant. Sub-routine 708 then terminates and process 700 proceeds back to operation 706. If the occupant should not be raised, sub-routine 708 proceeds to a determination operation 708D which determines if the occupant should be lowered. If the occupant should be lowered, sub-routine 708 proceeds to an operation 708E in which controller 38 commands seat-bottom mover 18 to lower the occupant. Sub-routine 708 then terminates and process 700 returns to operation 706. If the occupant should not be lowered, sub-routine 708 terminates and process 700 returns to sub-routine 708.

Once the occupant is in the optimal position, process 700 proceeds to determination operation 710 as shown in FIGS. 48 and 50. During determination operation 710, controller 38 using at least one of sensors S1, S2, S3 determines if the occupant is still on occupant-support base 12. If the occupant remains on occupant-support base 12, process 700 proceeds back to operation 706 which detects the vertical position of the occupant. If the occupant is no longer on occupant-support base 12, process 700 proceeds back to operation 702 which detects when an occupant has set on occupant-support base 12.

Controller 38 performs process 700 by receiving signals from various sensors including sensors S1, S2, and S3 and commanding operation of seat-bottom mover 18 and pneumatic system 20.

Pneumatic system 20 includes a manifold system 44 and an air pump 46 as shown in FIG. 4. Air pump 46 is configured to provide pressurized air at a pressure above atmospheric pressure ($P_{ATM}$) and a vacuum to upper and lower cushions 26U, 26L as suggested in FIG. 4. Air pump 46 is further coupled to manifold system 44 which communicates pressurized air or vacuum to upper and lower cushions 26U, 26L and communicates pressurized air from upper and lower cushions 26U, 26L to environment 42. Controller 38 is coupled to air pump 46 to control volume and pressure of air produced by air pump 46. Controller 38 is further coupled to manifold system 44 to control routing of pressurized air with respect to cushions 26U, 26L.

Manifold system 44 includes an upper manifold 48U, a lower manifold 48L, an upper set of exhaust valves 52U, a lower set of exhaust valves 52L, an upper vent valve 66U, a lower vent valve 66L, an inlet isolation valve 54, an outlet isolation valve 56, a pressure tank 58, an upper pressurizing valve 60, and a lower pressurizing valve 62 as shown in FIG. 25.

An upper-cushion loop 64U is formed by coupling together upper manifold 48U, upper set of exhaust valves 52U, a lower set of exhaust valves 54U, upper vent valve 66U, inlet isolation valve 54, air pump 46, outlet isolation valve 56, pressure tank 58, and upper pressurizing valve 60. A lower-cushion loop 64L is formed by coupling together lower manifold 48L, lower set of exhaust valves 52L, lower vent valve 66L, inlet isolation valve 54, air pump 46, outlet isolation valve 56, pressure tank 58, and lower pressurizing valve 62. Controller 38 is coupled to each of the components in upper-cushion loop 64U and lower-cushion loop 64L so that the amount of pressurized air in upper cushion 26U may be change independently of lower cushion 26L as shown in FIG. 26A.

In one example, air pump 46 has a volumetric flow rate of about 4 liters per minute and is used with pressure tank 58.

In another example, an air pump may have a volumetric flow rate of about 8 liters per minute and a pressure tank is then omitted from the pneumatic system.

Occupant-support base 112, as shown in FIGS. 27-29, is another embodiment in accordance with the present disclosure. Occupant-support base 112 further includes seat-bottom mover 18 and a seat pad 124. A pneumatic system 120 is coupled to seat bottom 112 to cause seat bottom 112 to assume at least one of a first arrangement (also called the normal-driving arrangement) shown in FIG. 28, a second arrangement (also called the fitted-driving arrangement) shown in FIG. 29, and a third arrangement (also called the ingress/egress arrangement) shown in FIG. 27. Together, seat bottom 112 and seat-bottom mover 18 cooperate to establish a seat base 116 as shown in FIG. 27.

Seat bottom 112 includes seat pan 22, first bolster 21, a seat pad 124, and second bolster 23 as shown in FIGS. 27-29. Seat pad 124 is coupled to seat pan 22 to move therewith and located between first and second bolsters 21, 23. Seat pad 124 is configured to provide means for varying a firmness level of seat pad 124 while varying a thickness of seat pad 124 to cause at least one of the first, second, and third arrangements as FIGS. 27-29 so that occupant-support base 112 is configured as desired by an occupant.

When seat pad 124 is in the first arrangement, a first firmness level is provided and a first thickness 1H1 of an upper seat-pad surface 124S of seat pad 124 is defined between upper seat-pad surface 124S and an upper seat-pan surface 22S of seat pan 22 as shown in FIG. 28. When seat pad 124 is in the second arrangement, a relatively greater second firmness level is provided and a relatively lesser second thickness 1H2 is provided as suggested in FIG. 29. When seat pad 24 is in the third arrangement, a relatively greater third firmness level is provided and a relatively greater third thickness 1H3 is established as shown in FIG. 27.

Seat pad 124 includes a cushion 126 and a cushion cover 127 as shown in FIGS. 27-29. Cushion cover 127 is located in spaced-apart relation above seat pan 22 and cushion 126 is located between cushion cover 127 and seat pan 22. Pneumatic system 120 is coupled to cushion 126 and is configured to supply pressurized air ($P_{MAX}$) to inflate cushion 126, expose cushion 126 to atmospheric pressure ($P_{ATM}$), and remove gas to establish a vacuum ($P_{VAC}$) in cushion 126 as suggested in FIGS. 27-29.

When seat pad 124 is in the first arrangement, cushion 126 has a first pressure 1P1 as shown in FIG. 28. When seat pad 124 is in the second arrangement, cushion 126 has a relatively lesser second pressure 1P2 as shown in FIG. 29. When seat pad 124 is in the third arrangement, cushion 126 has a relatively greater third pressure 1P3 as shown in FIG. 27.

In one illustrative example, first pressure 1P1 is at about atmospheric pressure ($P_{ATM}$) as suggested in FIG. 28. In comparison, relatively lesser second pressure 1P2 is less than atmospheric pressure and referred to as vacuum ($P_{VAC}$) as shown in FIG. 29. Relatively greater third pressure 1P3 is greater than atmospheric pressure. In one example, relatively greater third pressure 1P3 is at a maximum inflation level of cushion 126 as shown in FIG. 27.

As a result of varying pressures in cushion 126, density of cushion 126 also may be varied. When seat pad 124 is in the first arrangement, cushion 126 has a first density. When seat pad 124 is in the second arrangement, cushion 126 has a relatively greater second density. When seat pad 124 is in the third arrangement, cushion 126 has a relatively lesser third density which is less than the first density.

Cushion 126 of seat pad 124 includes a cushion bladder 128 and cushion core 130 as shown in FIGS. 27-29. Cushion bladder 128 is formed to includes a space 128S therein and cushion core 130 is located in space 128S as shown in FIGS. 27-29. When seat pad 124 is in the first arrangement, cushion core 130 has a first density. When seat pad 124 is in the second arrangement, cushion core 130 has a relatively greater second density. When seat pad 124 is in the third arrangement, cushion core 130 has the relatively lesser third density.

Pneumatic system 120 includes a manifold system 144 and air pump 46 as shown in FIG. 31. Air pump 46 is configured to provide pressurized air at a pressure above atmospheric pressure ($P_{ATM}$) and a vacuum to cushion 126. Air pump 46 is further coupled to manifold system 44 which communicates pressurized air or vacuum to cushion 126 and communicates pressurized air from cushion 126 to environment 42. Controller 38 is coupled to air pump 46 to control volume and pressure of air produced by air pump 46. Controller 38 is further coupled to manifold system 144 to control routing of pressurized air to cushion 126.

Manifold system 144 includes a manifold 148, an exhaust valve 152, a vent valve 166, inlet isolation valve 54, outlet isolation valve 56, pressure tank 58, and a pressurizing valve 160 as shown in FIG. 31. A cushion loop is formed by coupling together manifold 148, exhaust valve 152, vent valve 166, inlet isolation valve 54, air pump 46, outlet isolation valve 56, pressure tank 58, and pressurizing valve 160.

Occupant-support base 212, as shown in FIGS. 32-36, is another embodiment in accordance with the present disclosure. Occupant-support base 212 further includes seat-bottom mover 18 and a seat pad 224. Pneumatic system 20 is coupled to seat bottom 212 to cause seat bottom 212 to assume at least one of a first arrangement (also called the normal-driving arrangement) shown in FIGS. 32 and 34, a second arrangement (also called a firm-driving arrangement) shown in FIG. 35, a third arrangement (also called the performance-driving arrangement) shown in FIG. 36, and a fourth arrangement (also called ingress/egress arrangement) shown in FIG. 33. Together, seat bottom 212 and seat-bottom over 18 cooperate to establish a seat base 216 as shown in FIG. 33.

Seat bottom 212 includes seat pan 22, a first bolster 221, a seat pad 224, and a second bolster 223 as shown in FIGS. 32-36. Seat pad 224 is coupled to seat pan 22 to move therewith and located between first and second bolsters 221, 223. Seat pad 224 is configured to provide means for varying a firmness level of seat pad 224 while varying a thickness of seat pad 224 to cause at least one of the first, second, third and fourth arrangements so that occupant-support base 212 is configured as desired by an occupant.

When seat pad 224 is in the first arrangement, a first firmness level is provided and a first thickness 2H1 defined between upper seat-pad surface 224S and an upper seat-pan surface 22S of seat pan 22 as shown in FIGS. 32 and 34. When seat pad 224 is in the second arrangement, a relatively greater second firmness level is provided and the first thickness 2H1 is maintained as suggested in FIG. 35. When seat pad 224 is in the third arrangement, a relatively greater third firmness level is provided and a relatively lesser second thickness 2H2 is established as shown in FIG. 36. When seat pad 224 is in the fourth arrangement, a relatively greater fourth firmness level is provided and a relatively greater third thickness 2H3 is established as shown in FIG. 33.

Seat pad 224 includes an upper cushion 226U and a lower cushion 226L as shown in FIGS. 32-36. Upper cushion 226U is located in spaced-apart relation above seat pan 22. Lower cushion 226L is located between upper cushion 226U and seat pan 22. Pneumatic system 20 is coupled to both upper and lower cushions 226U, 226L and is configured to supply pressurized air ($P_{INF}$, $P_{MAX}$) to inflate cushions 226U, 226L, expose cushions 226U, 226L to atmospheric pressure ($P_{ATM}$), and remove gas to establish a vacuum ($P_{VAC}$) in cushions 226U, 226L as suggested in FIGS. 33-36.

When seat pad 224 is in the first arrangement, upper cushion 226U has a first upper pressure 2PU1, lower cushion 226U has a first lower pressure 2PL1, and bolsters 221, 223 have a first bolster pressure 2B1 as shown in FIG. 34. When seat pad 224 is in the second arrangement, upper cushion 226U has a relatively lesser second upper pressure 2PU2, lower cushion 226U has a relatively greater lower pressure 2PL2, and bolsters 221, 223 have the first bolster pressure 2B1 as shown in FIG. 35. When seat pad 224 is in the third arrangement, upper cushion 226U has relatively lesser second upper pressure 2PU2, lower cushion 226L has a relatively lesser third lower pressure 2PL3, and bolsters 221, 223 have a relatively greater second bolster pressure 2B2 as shown in FIG. 35. When seat pad 224 is in the fourth arrangement, upper cushion 226U has a relatively greater third upper pressure 2PU3, lower cushion 226L has the relatively greater second lower pressure 2PL2, and bolsters 221, 223 have the first bolster pressure 2B1 as shown in FIG. 33.

In one illustrative example, first upper and lower pressures 2PU1, 2PL1 and first bolster pressure 2B1 are at about atmospheric pressure ($P_{ATM}$) as suggested in FIG. 34. In comparison pressures 2PU2, 2PL3 are less than atmospheric and referred to as a vacuum ($P_{VAC}$) as shown in FIG. 36. Pressures 2PU3, 2PL2 and second bolster pressure 2B2 are greater than atmospheric pressure. In one example, pressures 2PU3, 2PL2 are sufficient to inflate upper and lower cushions 226U, 226L but below a maximum inflation level. In another example, pressures 2PU3, 2PL2 are at a maximum inflation level of upper and lower cushions 226U, 226L as shown in FIG. 33.

As a result of varying pressures in upper and lower cushions 226U, 226L and bolsters 221, 223, densities of upper and lower cushions 226U, 226L and bolsters 221, 223 may also be varied. When seat pad 224 is in the first arrangement, upper cushion 226U has a first upper density, lower cushion 226L has a first lower density, and bolsters 221, 223 have a first bolster density. When seat pad 224 is in the second arrangement, upper cushion 226U has a relatively greater second upper density, lower cushion 226L has a relatively lesser second lower density, and bolsters 221, 223 have the first bolster density. When seat pad 224 is in the third arrangement, upper cushion 226U has the relatively greater second upper density, lower cushion 226L has a relatively lesser third lower density, and bolsters 221, 223 have a relatively lesser second bolster density. When seat pad 224 is in the fourth arrangement, upper cushion 226U has a relatively lesser third upper density, lower cushion 226L has a relatively lesser fourth lower density, and bolsters 221, 223 have the first bolster density.

Upper cushion 226U of seat pad 224 includes a cushion bladder 228 and cushion core 230 as shown in FIG. 33. Cushion bladder 228 is formed to includes a space 228S therein and cushion core 230 is located in space 228S. When seat pad 224 is in the first arrangement, cushion core 230 has a first density. When seat pad 224 is in the second arrangement, cushion core 230 has a relatively greater second density. When seat pad 224 is in the third arrangement, cushion core 230 has the relatively greater second density. When seat pad is in the fourth arrangement, cushion core 230 has the first density.

Lower cushion 226L of seat pad 224 includes a cushion bladder 232 and cushion core 234 as shown in FIG. 33. Cushion bladder 232 is formed to includes a space 232S therein and cushion core 234 is located in space 232S. When seat pad 224 is in the first arrangement, cushion core 234 has a first density. When seat pad 224 is in the second arrangement, cushion core 234 has the first density. When seat pad 224 is in the third arrangement, cushion core 234 has a relatively greater second density. When seat pad is in the fourth arrangement, cushion core 230 has the first density.

Occupant-support base 312, as shown in FIGS. 37-40, is another embodiment in accordance with the present disclosure. Occupant-support base 312 further includes seat-bottom mover 18 and a seat pad 324. Pneumatic system 20 is coupled to seat bottom 312 to cause seat bottom 312 to assume at least one of a first arrangement (also called the normal-driving arrangement) shown in FIG. 38, a second arrangement (also called a firm-driving arrangement) shown in FIG. 39, a third arrangement (also called the performance-driving arrangement) shown in FIG. 40, and a fourth arrangement (also called ingress/egress arrangement) shown in FIG. 37. Together, seat bottom 312 and seat-bottom over 18 cooperate to establish a seat base 316 as shown in FIG. 37.

Seat bottom 312 includes seat pan 22, a first bolster 321, a seat pad 324, and a second bolster 323 as shown in FIGS. 37-40. Seat pad 324 is coupled to seat pan 22 to move therewith and located between first and second bolsters 321, 323. Seat pad 324 is configured to provide means for varying a firmness level of seat pad 324 while varying a thickness of seat pad 324 to cause at least one of the first, second, third and fourth arrangements so that occupant-support base 312 is configured as desired by an occupant.

When seat pad 324 is in the first arrangement, a first firmness level is provided and a first thickness 3H1 of an upper seat-pad surface 324S of seat pad 324 is defined between upper seat-pad surface 324S and an upper seat-pan surface 22S of seat pan 22 as shown in FIG. 38. When seat pad 324 is in the second arrangement, a relatively greater second firmness level is provided and the first thickness 3H1 is maintained as suggested in FIG. 39. When seat pad 324 is in the third arrangement, a relatively greater third firmness level is provided and a relatively lesser second thickness 3H2 is established as shown in FIG. 40. When seat pad 324 is in the fourth arrangement, a relatively greater fourth firmness level is provided and a relatively greater third thickness 3H3 is established as shown in FIG. 37.

Seat pad 324 includes an upper cushion 326U and a lower cushion 326L as shown in FIGS. 37-40. Upper cushion 326U is located in spaced-apart relation above seat pan 22. Lower cushion 326L is located between upper cushion 326U and seat pan 22. Pneumatic system 20 is coupled to both upper and lower cushions 326U, 326L and is configured to supply pressurized air ($P_{INF}$, $P_{MAX}$) to inflate cushions 326U, 326L, expose cushions 326U, 326L to atmospheric pressure ($P_{ATM}$), and remove gas to establish a vacuum ($P_{VAC}$) in cushions 326U, 326L as suggested in FIGS. 37-40.

When seat pad 324 is in the first arrangement, upper cushion 326U has a first upper pressure 3PU1, lower cushion 326U has a first lower pressure 3PL1, and bolsters 321, 323 have a first bolster pressure 3B1 as shown in FIG. 38. When seat pad 324 is in the second arrangement, upper cushion 326U has a relatively greater second upper pressure 3PU2, lower cushion 326U has a relatively lesser second lower pressure 3PL2, and bolsters 321, 323 have the first bolster pressure 3B1 as shown in FIG. 39. When seat pad 324 is in the third arrangement, upper cushion 326U has relatively lesser third upper pressure 3PU3, lower cushion 326L has the relatively lesser second lower pressure 3PL2, and bolsters 321, 323 have a relatively greater second bolster pressure 3B2 as shown in FIG. 40. When seat pad 324 is in the fourth arrangement, upper cushion 326U has a relatively greater fourth upper pressure 3PU4, lower cushion 326L has the relatively greater third lower pressure 3PL3, and bolsters 321, 323 have the first bolster pressure 3B1 as shown in FIG. 37.

In one illustrative example, first upper and lower pressures 3PU1, 3PL1 and first bolster pressure 3B1 are at about atmospheric pressure ($P_{ATM}$) as suggested in FIG. 38. In comparison, relatively greater second upper pressure 3PU2, relatively greater third lower pressure 3PL3, and relatively greater fourth upper pressure 3PU4 are greater than atmospheric pressure. Second bolster pressure 3B2 is also greater than atmospheric pressure. Relatively lesser second lower pressure 3PL2 and relatively lesser third upper pressure 3PU3 are less than atmospheric and referred to as a vacuum ($P_{VAC}$) as shown in FIG. 40.

As a result of varying pressures in upper and lower cushions 326U, 326L and bolsters 321, 323, densities of upper and lower cushions 326U, 326L and bolsters 321, 323 may also be varied. When seat pad 324 is in the first arrangement, upper cushion 326U has a first upper density, lower cushion 326L has a first lower density, and bolsters 321, 323 have a first bolster density. When seat pad 324 is in the second arrangement, upper cushion 326U has a relatively lesser second upper density, lower cushion 326L has a relatively greater second lower density, and bolsters 321, 323 have the first bolster density. When seat pad 324 is in the third arrangement, upper cushion 326U has the relatively greater third upper density, lower cushion 326L has the relatively greater second lower density, and bolsters 321, 323 have a relatively lesser second bolster density. When seat pad 324 is in the fourth arrangement, upper cushion 326U has a relatively lesser fourth upper density, lower cushion 326L has a relatively lesser third lower density, and bolsters 321, 323 have the first bolster density.

Upper cushion 326U of seat pad 324 includes a cushion bladder 228 and cushion core 330 as shown in FIG. 37. Cushion bladder 328 is formed to includes a space 328S therein and cushion core 330 is located in space 328S. When seat pad 324 is in the first arrangement, cushion core 330 has a first density. When seat pad 324 is in the second arrangement, cushion core 330 has the first density. When seat pad 324 is in the third arrangement, cushion core 330 has a relatively greater second density. When seat pad 324 is in the fourth arrangement, cushion core 330 has the first density.

Lower cushion 326L of seat pad 224 includes a cushion bladder 332 and cushion core 334 as shown in FIG. 37. Cushion bladder 332 is formed to includes a space 332S therein and cushion core 334 is located in space 332S. When seat pad 324 is in the first arrangement, cushion core 334 has a first density. When seat pad 324 is in the second arrangement, cushion core 334 has a relatively greater second density. When seat pad 324 is in the third arrangement, cushion core 334 has the relatively greater second density. When seat pad 334 is in the fourth arrangement, cushion core 330 has the first density.

Occupant-support base 412, as shown in FIGS. 41 and 42, is another embodiment in accordance with the present disclosure. Occupant-support base 412 further includes seat-bottom mover 18 and a seat pad 424. Pneumatic system 20 is coupled to seat bottom 412 to cause seat bottom 412 to assume various arrangements. Seat bottom 412 includes seat pan 22, a first bolster 421, a seat pad 424, and a second bolster 423 as shown in FIGS. 41 and 42. Seat pad 424 is coupled to seat pan 22 to move therewith and located between first and second bolsters 421, 423. Seat pad 424 is configured to provide means for varying a firmness level of seat pad 424 while varying a thickness of seat pad 424 to cause various arrangements to be established so that occupant-support base 412 is configured as desired by an occupant.

Seat pad 424 includes an upper cushion 426U and a lower cushion 426L as shown in FIGS. 41 and 42. Upper cushion 426U is located in spaced-apart relation above seat pan 22. Lower cushion 426L is located between upper cushion 426U and seat pan 22. Pneumatic system 20 is coupled to both upper and lower cushions 426U, 426L and is configured to supply pressurized air ($P_{INF}$, $P_{MAX}$) to inflate cushions 426U, 426L, expose cushions 426U, 426L to atmospheric pressure ($P_{ATM}$), and remove gas to establish a vacuum ($P_{VAC}$) in cushions 426U, 426L.

Upper cushion 426U of seat pad 424 includes a cushion bladder 428 and cushion core 430 as shown in FIG. 41. Cushion bladder 428 is formed to includes a space 428S therein and cushion core 430 is located in space 428S. Cushion core 430 includes a first upper layer 430A and a second upper layer 430B located between first upper layer 430A and lower cushion 426L. In one example, first upper layer 430A is made from a first foam material and second upper layer 430B is made from a second foam material. The first and second foam materials may be the same or different.

Lower cushion 426L of seat pad 424 includes a cushion bladder 432 and cushion core 434 as shown in FIG. 42. Cushion bladder 432 is formed to includes a space 432S therein and cushion core 434 is located in space 432S. Cushion core 434 includes a first lower layer 434A and a second lower layer 434B located between first upper layer 430A and seat pan 22. In one example, first lower layer 434A is made from a first foam material and second lower layer 434B is made from a second foam material. The first and second foam materials may be the same or different.

Occupant-support base 512, as shown in FIGS. 43 and 44, is another embodiment in accordance with the present disclosure. Occupant-support base 512 further includes seat-bottom mover 18 and a seat pad 524. Pneumatic system 20 is coupled to seat bottom 512 to cause seat bottom 512 to assume various arrangements. Seat bottom 512 includes seat pan 22, a first bolster 521, a seat pad 524, and a second bolster 523 as shown in FIGS. 43 and 44. Seat pad 524 is coupled to seat pan 22 to move therewith and located between first and second bolsters 521, 523. Seat pad 524 is configured to provide means for varying a firmness level of seat pad 524 while varying a thickness of seat pad 524 to cause various arrangements to be established so that occupant-support base 512 is configured as desired by an occupant.

Seat pad 524 includes an upper cushion 526U and a lower cushion 526L as shown in FIGS. 43 and 44. Upper cushion 526U is located in spaced-apart relation above seat pan 22. Lower cushion 526L is located between upper cushion 526U and seat pan 22. Pneumatic system 20 is coupled to both upper and lower cushions 526U, 526L and is configured to supply pressurized air ($P_{INF}$, $P_{MAX}$) to inflate cushions 526U, 526L, expose cushions 526U, 526L to atmospheric pressure ($P_{ATM}$), and remove gas to establish a vacuum ($P_{VAC}$) in cushions 526U, 526L.

Upper cushion 526U of seat pad 524 includes a cushion bladder 528 and cushion core 530 as shown in FIG. 44. Cushion bladder 528 is formed to includes a space 528S therein and cushion core 530 is located in space 528S. Cushion core 530 includes a plurality of foam spheres 530A. Plurality of foam spheres 530A are able to move relative to one another when pressure in cushion bladder 528 is at or above atmospheric pressure. When pressure in cushion bladder 528 is below atmospheric pressure, movement between plurality of foam spheres 530A is minimized.

Lower cushion 526L of seat pad 524 includes a cushion bladder 532 and cushion core 534 as shown in FIG. 44. Cushion bladder 532 is formed to includes a space 532S therein and cushion core 534 is located in space 532S.

Occupant-support base 612, as shown in FIGS. 45 and 46, is another embodiment in accordance with the present disclosure. Occupant-support base 612 further includes seat-bottom mover 18 and a seat pad 624. Pneumatic system 20 is coupled to seat bottom 612 to cause seat bottom 612 to assume various arrangements. Seat bottom 612 includes seat pan 22, a first bolster 621, a seat pad 624, and a second bolster 623 as shown in FIGS. 45 and 46. Seat pad 624 is coupled to seat pan 22 to move therewith and located between first and second bolsters 621, 623. Seat pad 624 is configured to provide means for varying a firmness level of seat pad 624 while varying a thickness of seat pad 624 to cause various arrangements to be established so that occupant-support base 612 is configured as desired by an occupant.

Seat pad 624 includes an upper cushion 626U and a lower cushion 626L as shown in FIGS. 45 and 46. Upper cushion 626U is located in spaced-apart relation above seat pan 22. Lower cushion 626L is located between upper cushion 626U and seat pan 22. Pneumatic system 20 is coupled to both upper and lower cushions 626U, 626L and is configured to supply pressurized air ($P_{INF}$, $P_{MAX}$) to inflate cushions 626U, 626L, expose cushions 626U, 626L to atmospheric pressure ($P_{ATM}$), and remove gas to establish a vacuum ($P_{VAC}$) in cushions 626U, 626L.

Upper cushion 626U of seat pad 624 includes a cushion bladder 628 and cushion core 630 as shown in FIG. 45. Cushion bladder 628 is formed to includes a space 628S therein and cushion core 630 is located in space 628S. Cushion core 630 includes a core body 630A formed to include passageways 630B therein and pillars 630C located in passageways 630B of core body 630A. Each pillar 630C is arranged to extend between and interconnect an upper portion 628A of upper bladder 628A and a lower portion 628B of upper bladder 628 to block a upper surface 624S of the seat pad 624 from establishing a convex shape that extends upwardly away from seat pan 22 from forming when pressurized gas ($P_{INF}$) is admitted into upper bladder 626U to cause upper bladder 626U to inflate and establish a maximum volume of upper bladder 626U.

Lower cushion 626L of seat pad 624 includes a cushion bladder 632 and cushion core 634 as shown in FIG. 45. Cushion bladder 632 is formed to includes a space 632S therein and cushion core 634 is located in space 632S.

The invention claimed is:

1. An occupant-support base for a vehicle seat, the occupant-support base comprising
a seat pan and
a seat pad coupled to the seat pan to move therewith and configured to provide means for varying a firmness level of the seat pad while varying a thickness of the seat pad to cause
at least a first arrangement of the occupant-support base to be established in which a first firmness level is provided and a first thickness of the seat pad is established, the first thickness being defined between an upper seat-pad surface and an upper seat-pan surface of the seat pan, and
at least a second arrangement of the occupant-support base to be established in which a relatively greater second firmness level is provided and a relatively lesser second thickness is established so that the seat pad is configured as desired by an occupant, and
a control system including a first sensor configured to detect a presence of an occupant resting on the occupant-support base and provide a first signal indicative of the presence of the occupant resting on the occupant-support base, a second sensor configured to detect a vertical position of an occupant-reference point of an occupant supported by the occupant-support base and provide a second signal indicative of the vertical position of the occupant-reference point, and a controller coupled to the first and second sensors to receive the first and second signals and command a seat-bottom mover to change the vertical location of the seat pan to cause an optimal location of the occupant to be maintained.

2. The occupant-support base according to claim 1, wherein the seat pad includes an upper cushion located above the seat pan and a lower cushion located between the upper cushion and the seat pan.

3. The occupant-support base according to claim 2, further comprising a pneumatic system coupled to the upper cushion to remove gas from the upper cushion to establish a vacuum pressure in the upper cushion to cause the second arrangement to be established.

4. The occupant-support base according to claim 3, wherein the lower cushion is coupled to the pneumatic system to remove gas from the lower cushion to establish a vacuum pressure in the lower cushion to cause the second arrangement to be established.

5. The occupant-support base according to claim 2, wherein the upper cushion includes a cushion bladder formed to include a space therein and a cushion core positioned to lie in the space.

6. The occupant-support base according to claim 5, wherein the cushion core has a first density when the occupant-support base is in the first arrangement and a relatively greater second density with the occupant-support base is in the second arrangement.

7. The occupant-support base according to claim 1, wherein the occupant-reference point is an H-point of the occupant.

8. The occupant-support base according to claim 1, wherein the occupant-reference point is an eye level of the occupant.

9. The occupant-support base according to claim 1, wherein a third arrangement of the occupant-support base is established in which a relatively greater third firmness level is provided and a relatively lesser third thickness is established, the relatively greater third firmness is firmer than the relatively greater second firmness, and the relatively lesser third thickness is less than the relatively lesser second thickness.

10. The occupant-support base according to claim 1, wherein the seat pad includes an upper cushion located in spaced-apart relation above the seat pan and a lower cushion located between the upper cushion and the seat pan and the upper cushion has a first upper pressure and the lower cushion has a first lower pressure when the occupant-support base is in the first arrangement.

11. The occupant-support base according to claim 10, wherein the upper cushion has a relatively lesser second upper pressure and the lower cushion has the first lower pressure when the occupant-support base is in the second arrangement.

12. The occupant-support base according to claim 1, wherein the seat pad includes an upper cushion located in spaced-apart relation above the seat pan and a lower cushion located between the upper cushion and the seat pan and the upper cushion has a first upper density and the lower cushion has a first lower density when the occupant-support base is in the first arrangement and the seat base further includes a first bolster and a second bolsters spaced-apart from the first bolster to locate the seat pad therebetween and the first bolster and the second bolster each have a first bolster pressure therein when the occupant-support base is in the first arrangement.

13. The occupant-support base according to claim 12, wherein the upper cushion has a relatively greater second upper density, the lower cushion has a relatively greater second lower density, and the first and second bolsters have a relatively greater second bolster pressure therein when the occupant-support base is in the second arrangement.

14. The occupant-support base according to claim 1, wherein the seat pad includes an upper cushion including an upper bladder formed to include an upper-bladder space and an upper core located therein and a lower cushion including a lower bladder formed to include a lower-bladder space and a lower core located in the lower-bladder space.

15. The occupant-support base according to claim 14, wherein the upper core is made of a foam material and the lower core is made from a foam material.

16. The occupant-support base according to claim 14, wherein the upper core includes a first upper layer and a second upper layer located between the first upper layer and the lower cushion, the first upper layer is made from a first foam material and the second upper layer is made from a second foam material, and the first foam material is different than the second foam material.

17. The occupant-support base according to claim 14, wherein the upper core includes a plurality of foam spheres and the plurality of spheres move relative to one another when the occupant-support base is in the first arrangement.

18. The occupant-support base according to claim 14, wherein movement between the plurality of spheres relative to one another is minimized in response to removing gas from the upper cushion to establish a vacuum pressure therein.

19. The occupant-support base according to claim 14, wherein the upper core includes a core body formed to include a passageway therein and a pillar located in the passageway of the core body and arranged to extend between and interconnect an upper portion of the upper bladder and a lower portion of the upper bladder to block the upper surface of the seat pad from establishing a convex shape that extends upwardly away from the seat pan from forming when pressurized gas is admitted into the upper bladder to cause the upper bladder to inflate and establish a maximum volume of the upper bladder.

20. The occupant-support base according to claim 14, wherein the upper core includes a core body formed to include passageways spaced apart from one another and a plurality of pillars, one of the plurality of pillars is located in each passageway, and each pillar is arranged to extend between and interconnect an upper portion of the upper bladder and a lower portion of the upper bladder to cause the upper surface of the seat pad to establish an undulating shape.

21. The occupant-support base according to claim 1, wherein the controller, in response to receipt of the first sensor signal indicating an occupant is resting on the occupant-support base determines a minimal amount electrical current required to move the seat-bottom mover and determines a weight of the occupant using the minimal amount of electrical current.

22. The occupant-support base according to claim 21, wherein the controller uses the weight of the occupant to determine a seat-bottom mover rate and uses the seat-bottom mover rate to cause the optimal location of the occupant to be maintained.

* * * * *